(12) United States Patent
Kitamura et al.

(10) Patent No.: US 7,241,044 B1
(45) Date of Patent: Jul. 10, 2007

(54) PRODUCTION CONTROL SYSTEM OF AUTONOMOUS AND DECENTRALIZED TYPE

(75) Inventors: Koichi Kitamura, Yokohama (JP); Shigeru Masuda, Yokohama (JP); Shunji Mohri, Yokohama (JP); Tadamasa Kamikubo, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/483,885

(22) Filed: Jun. 7, 1995

Related U.S. Application Data

(63) Continuation-in-part of application No. 07/977,249, filed on Nov. 16, 1992, now abandoned.

(30) Foreign Application Priority Data

Nov. 14, 1991 (JP) ............................................. 3-298670
Nov. 20, 1991 (JP) ............................................. 3-304454

(51) Int. Cl.
 *G06F 19/00* (2006.01)

(52) U.S. Cl. ............................ 364/468.01; 364/468.07; 364/468.2; 364/474.21

(58) Field of Classification Search ............ 364/468.22, 364/468.23, 468.2, 468.19, 468.01, 468.05, 364/468.06, 468.07, 478.07, 478.16, 478.17, 364/468.08, 468.18, 468.1; 395/670, 671, 395/673, 675
See application file for complete search history.

(56) References Cited

U.S. PATENT DOCUMENTS

| | | | | | |
|---|---|---|---|---|---|
| 4,473,883 | A | * | 9/1984 | Yoshida | 364/468 X |
| 4,896,269 | A | * | 1/1990 | Tong | 364/468 |
| 4,994,980 | A | * | 2/1991 | Lee et al. | 364/474.15 |
| 5,126,932 | A | * | 6/1992 | Wolfson et al. | 364/468 X |
| 5,148,370 | A | * | 9/1992 | Litt et al. | 364/468 |
| 5,164,905 | A | * | 11/1992 | Iwasaki et al. | 364/478 X |
| 5,166,884 | A | * | 11/1992 | Maney et al. | 364/468.2 |
| 5,282,139 | A | * | 1/1994 | Kobayashi | 364/468.07 |

* cited by examiner

*Primary Examiner*—Reba I. Elmore
*Assistant Examiner*—Sheela S. Rao
(74) *Attorney, Agent, or Firm*—Antonelli, Terry, Stout & Kraus, LLP

(57) ABSTRACT

An autonomous and decentralized production control system comprising a plurality of production cells for performing the assembly and machining work. Each production cell proceeds with the production procedure by performing jobs in accordance with the works charged thereinto. A first embodiment comprises working cells each including a device for determining the working cell for executing an intended job. A second embodiment comprises a pallet for carrying an object of a job, and a device for determining the order of job priority in order to meet the product delivery time. Each working cell decides on the advisability and time of performing the job on the object, thereby autonomously implementing the production control.

11 Claims, 21 Drawing Sheets

FIG. 2

| WORK NO. | JOB COMPLETION | WORK SHAPE | NUMBER OF JOBS |
|---|---|---|---|
| 101 | NO | FIG. 3A | 2 |

201  202  203  204

WORK 1

| JOB NAME | ACCURACY | MACHINING SHAPE | NUMBER OF PRECEDING JOBS | JOB COMPLETION |
|---|---|---|---|---|
| ROUGH MACHINING | 500 | FIG. 3B | 0 | NO |

205a  205b  205c  205d  205f

205

WORK 2

| JOB NAME | ACCURACY | MACHINING SHAPE | NUMBER OF PRECEDING JOBS | PRECEDING JOB | JOB COMPLETION |
|---|---|---|---|---|---|
| FINISH MACHINING | 100 | FIG. 3C | 1 | WORK 1 | NO |

205e

FIG. 3A
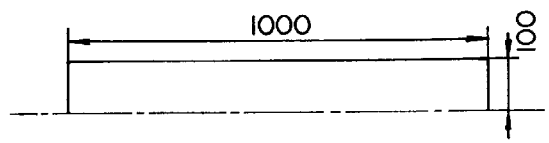
FIG. 3B
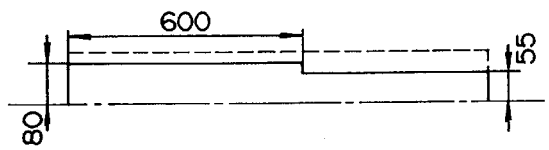
FIG. 3C
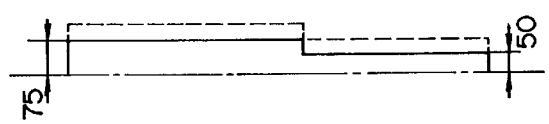
FIG. 4
| WORK NO. | WORK CONDITION | ORDER OF CHARGING | DELIVERY TIME | ORDER OF PRIORITY |
|---|---|---|---|---|
| 102 | READY FOR JOB | 1 | 7/20 | 4 |
| 105 | JOB IN PROCESS | 2 | 7/17 | 3 |
| 101 | READY FOR JOB | 3 | 7/18 | 2 |
| 103 | READY FOR JOB | 4 | 7/19 | 1 |
| | | | | |

FIG. 13

| WORK NO. 1301 | JOB COMPLETION FLAG 1302 | WORK SHAPE 1303 | NUMBER OF JOBS 1304 | PREDICTED MAXIMUM JOB TIME 1305 | DELIVERY TIME 1306 |
|---|---|---|---|---|---|
| 101 | No | FIG. 3A | 2 | 4 hrs | 9/19 |

| JOB NO. 1307 | JOB COMPLETION FLAG 1308 | PRECEDING JOB NO. 1309 | ACCURACY 1310 | | MACHINING 1311 |
|---|---|---|---|---|---|
| 1 | No | 0 | 6.3 | | FIG. 3B |
| 2 | No | 1 | 0.8 | | FIG. 3C |

FIG. 14

| 1401 | 1402 | 1403 | 1404 |
|---|---|---|---|
| WORK NO. | WORK SHAPE | NUMBER OF REMAINING JOBS | PREDICTED MAXIMUM RESIDUAL JOB TIME |
| 101 | FIG. 3B | 1 | 3 HOURS |

FIG. 15

| 1501 | 1502 | 1503 |
|---|---|---|
| WORK NO. | PRIORITY | JOB-IN-PROCESS FLAG |
| 101 | 10 | YES |
| 102 | 8 | NO |
| 105 | 7 | YES |
| 104 | 4 | YES |
| 106 | 2 | NO |
| 103 | 1 | NO |

FIG. 16

| 1601 | 1602 | 1603 | 1604 | 1605 | 1606 |
|---|---|---|---|---|---|
| POSITION | JOB TYPE | ACCURACY | SPEED | MAXIMUM SIZE | MINIMUM SIZE |
| A2 | LATHE | 1.0 | 5 | 5000*250*250 | 500*50*50 |

FIG. 22

| WORK NO. | JOB COMPLETION FLAG | WORK SIZE | NUMBER OF JOBS | PREDICTED MAXIMUM JOB TIME | DELIVERY TIME |
|---|---|---|---|---|---|
| 101 | No | 280 * 190 | 156 | 4 HOURS | 10/18 |

| JOB NO. | JOB COMPLETION FLAG | PRECEDING JOB NO. | PART TYPE | PART POSITION | ASSEMBLY POSITION |
|---|---|---|---|---|---|
| 1 | No | 0 | QFP 1H | 150 * 100 | 350 * 150 |
| ? | ? | ? | ? | | |
| 24 | No | 23 | QFP 3H | | |
| 25 | No | 24 | DEFORMED PART 1 | | |
| 26 | No | 24 | DEFORMED PART 1 | | |
| 27 | No | 26 | DIP 40P | | |
| ? | ? | ? | ? | | |
| 48 | No | 47 | DIP 20P | | |
| 49 | No | 48 | DEFORMED PART 51 | | |
| 50 | No | 49 | DIP 14P | | |
| ? | ? | ? | ? | | |
| 89 | No | 88 | DIP 12P | | |
| 90 | No | 89 | DEFORMED PART 28 | | |
| 91 | No | 90 | DEFORMED PART 13 | | |
| 92 | No | 91 | AXIAL PART 34 | | |
| ? | ? | ? | ? | | |
| 113 | No | 112 | AXIAL PART 1 | | |
| 114 | No | 113 | DEFORMED PART 5 | | |
| 115 | No | 114 | AXIAL PART 113 | | |
| ? | ? | ? | ? | | |
| 141 | No | 140 | AXIAL PART 49 | | |
| 142 | No | 141 | DEFORMED PART 46 | | |
| ? | ? | ? | ? | | |
| 156 | No | 155 | DEFORMED PART 27 | 250 * 100 | 264 * 112 |

FIG. 23

| 2301 | 2302 | 2303 |
|---|---|---|
| WORK NO. | NUMBER OF REMAINING JOBS | PREDICTED MAXIMUM RESIDUAL JOB TIME |
| 101 | 106 | 2.5 HOURS |

FIG. 24

| 2401 | 2402 | 2403 | 2404 |
|---|---|---|---|
| POSITION | JOB TYPE | ACCURACY | SPEED |
| A2 | SURFACE PACKAGING | 0.1 | 4 |

PRODUCTION CONTROL SYSTEM OF AUTONOMOUS AND DECENTRALIZED TYPE

This application is a continuation-in-part of Ser. No. 07/977,249, filed Nov. 16, 1992, now abandoned.

BACKGROUND OF THE INVENTION

1. Field of the Invention

The present invention relates to a production control system, or more in particular to an apparatus, equipment and a control system required for constructing a flexible production system.

2. Description of the Prior Art

In conventional production control systems, an operating schedule is formed on the basis of a product specification for each piece of production equipment, equipment control data for implementing a job for each piece of equipment is prepared and stored in the related equipment, and the job is performed according to the operating schedule. These conventional systems require a system shutdown to correct equipment control units and the operating schedule to alter the product specification or the production equipment. A similar system shutdown and repair work is also required when fault of an equipment part occurs.

A solution to these problems has been suggested by "Production Control System of Process-Led Operation Selection Type" disclosed in JP-A-1-321503 and "Information Processing System for Processing Cells of Autonomous and Decentralized Type" in JP-A-2-236604, in which the equipment is not assigned with any job but autonomously selects and proceeds with a job for the work to thereby construct a flexible production control system.

According to the prior art disclosed in JP-A2-236604 primarily intended for a processing job, for example, each working cell making up a production control system conducts the job on its own as required on the basis of the processing information, etc. added to the work charged thereto. Also, a plurality of working cells having substantially the same specification are arranged to provide system flexibility, and makes possible the operation of a replacement cell when a cell malfunctions while at the same time assuring load equalization among different cells.

In the prior art systems described above, the equipment simply receives an incoming work and decides whether or not it is capable of performing the next job on the particular work. More specifically, if a job is capable of being performed, the equipment never fails to implement the next job. This system necessitates information exchange only with a single work in selecting a job, and therefore the algorithm for job selection is simple and causes no interference with the remaining equipment. In view of the fact that the equipment concentrates on a single work for job selection, however, the information regarding the remaining works is not taken into consideration in job selection. As a result, the delivery time of a particular product is disregarded. This not only makes it difficult to predict the completion time of a product, but also no priority is given even to a work of urgent necessity.

Where there are a plurality of works intended for a given job, the job is conventionally performed on first-come-first-served basis but no consideration is given to the order of priority based on delivery time or the like. As a consequence, a work with a short lead time, or especially, a work whose processing is of urgent necessity is unavoidably placed in the hands of the operator. Further, since works are controlled by work type, an urgent work which may occur cannot be processed until completion of a job on all the works of a particular work type in the process of operation.

In conventional systems, the processing operations required for works are similar to each other, and therefore flexibility could be simply obtained by a parallel arrangement of a plurality of cells of the same specification. In such production control systems, the workability including the possibility of a given job in other cells and the time required for the job are known in advance and need not be confirmed.

Nevertheless, in the assembly work which unlike the processing work has a smaller similarity between the jobs performed on different works, a system is difficult to construct only with cells of substantially the same specification. A production control system including the assembly work, therefore, requires an arrangement of cells having different functions. This requirement is not fully met by conventional production control systems which fail to confirm the workability of other cells as described above.

SUMMARY OF THE INVENTION

An object of the present invention is to provide a highly flexible autonomous and decentralized production control system for performing a job in accordance with the order of work priority in order to meet the delivery time of a particular product.

Another object of the present invention is to provide a highly flexible autonomous and decentralized production control system which easily meets a change in product specification or equipment configuration or an equipment malfunction without sacrificing production efficiency.

Still another object of the present invention is to provide an autonomous and decentralized production control system which meets a job requirement involving a number of dissimilar jobs as in an assembly work.

According to the present invention which has been made in order to achieve the above-mentioned objects, there is provided a work administration system comprising a storage unit for storing a work intended for job performance and the information for a job to be performed on the work, transport unit for delivering the work out of or into the storage unit, and work administration unit having the administration information on the works in the storage unit, deciding the order of priority of the works in accordance with the work administration information and causing the transport unit to deliver the top-priority work and/or the job information on the particular work.

The work administration information preferably contains at least one of the information including the time of delivering the work into the storage unit and the required completion time of the job.

The work administration system further comprises communication unit for transmitting information with a working cell performing the job on a work. The work administration unit preferably decides the order of priority when a "work demand" is received from the working cell through the communication unit and outputs the job information of the top-priority work through the communication unit. Further, the work administration unit preferably causes the work and/or the job information on the work to be delivered through the communication unit at the time work output instruction is received from the working cell.

The work and/or the job information is preferably delivered out for a demanding working cell at a demanded time in accordance with the output instruction.

According to another aspect of the present invention, there is provided a working cell for performing the job of an intended work, comprising an input unit for inputting the job information including information of at least one job, a job execution unit for actually carrying out the job, an inter-cell communication unit for exchanging information with other working cells, a job extraction unit for extracting a job to be performed first at the time point, job workability decision unit for deciding whether or not a job can be implemented by the job execution unit and answering an inquirer, and working cell determining unit for making inquiry as to the workability of a job extracted from the job extracting unit, through the inter-cell communication unit from the workability decision unit for other working cells and directly from the job workability decision unit for its own working cell to thereby determine a working cell for executing the job on the basis of the answer to the inquiry.

The input unit may be communication unit for transmitting and receiving information to and from the work administration system for managing works, and the working cell determination unit may have the function of demanding the job information for a new work from the work administration system through the communication unit.

The workability decision unit, when a particular job under inquiry is executable, may cause the answer to contain at least one of the information including not only the workability of the particular job but also the time when the job can be started, the scheduled time of job completion and the type of job executable by the working cell. In such a case, the system may comprise a self-monitoring unit for monitoring the progress of job execution by the job execution unit and deciding that a particular cell is out of order when the job cannot be completed before the scheduled job completion time.

According to a further aspect of the present invention, there is provided an autonomous and decentralized production control system comprising a plurality of working cells for executing a job, a work administration system for managing the works to be processed, network unit for connecting the working cells to each other and the working cells to the work administration system for exchanging information. The working cells include a job extraction unit for actually executing a job; a job extracting unit for extracting a job to be executed first of all at the time point from the job information input from the work administration system through the network unit; a workability decision unit for receiving an inquiry as to whether a job is executable or not, deciding on whether the job is executable by the job execution unit and giving an answer to the inquirer; a working cell determining unit having the function of outputting a "work demand" to the work administration system through the network unit; and making an inquiry to the workability decision unit for other cells through the network unit and directly to its own workability decision unit to determine a working cell for executing the job on the basis of the answer to the inquiry. The work administration system includes a storage unit for storing job information indicating the work intended for a job and the job to be performed on the work, a transport unit for delivering the work out of or into the storage unit, and a work administration unit for deciding the order of priority of works on the basis of the work administration information upon receipt of a "work demand" from the working cell determining unit and outputting the job information on the top-priority work on the one hand while at the same time causing the transport unit to deliver the top-priority work and/or the job information in accordance with an output instruction from the working cell determining unit.

As second unit for solving the above-mentioned problems of the conventional systems, according to the present invention, there is provided an autonmous and decentralized production control system in which a pallet with a work placed thereon has the functions of selecting the equipment, determining the order of work priority and requesting a job. This system is called a "work driven production control system".

According to the present invention, each time a work on a pallet is newly charged, the priority of its own work is transmitted through an inter-pallet communication unit to a work priority storage unit. A job request right effectuation unit reads information out of the work priority storage unit, and assigns the job request right to the pallets carrying the particular work in the descending order of priority. The equipment selection unit for a pallet that has acquired the job request right issues the next job for the work to the equipment. The job work workability decision unit of the equipment determines whether the job is executable or not, and replies to the equipment. If executable, the equipment selection unit request the job of the equipment. The equipment in turn issues a job request completion report to the job request effectuation unit. If the job is impossible to execute, on the other hand, the pallet transmits the decision to the job request right effectuation unit as a non-selectability notice. Thus the pallet waits for the next chance of job selection. The job request right effectuation unit, upon receipt of a non-selectability notice from a pallet, grants the job request right to the pallet ranking next in the order of priority.

Upon job completion, the work information after job completion is transmitted from the equipment to the pallet carrying a work and an equipment job completion report to the work priority determining unit. The work priority determining unit recalculates the order of priority from the work conditions at the time of job completion, updates the information of the work priority storage unit, and updates and transmits the information in the work priority storage unit to thereby transmit a work job completion notice to the job request right effectuation unit.

The above-mentioned procedure is repeated until every work exercises the job request properly. Negotiations are thus made with the equipment always in the descending order of work priority, and therefore the Product delivery time is taken into consideration.

BRIEF DESCRIPTION OF THE DRAWINGS

FIG. 2 is a diagram showing an example of job information relating to a job conducted on a work.

FIGS. 3A to 3C are side views of the shapes of works.

FIG. 4 is a diagram showing an example of work administration table.

FIG. 13 is a diagram showing an example of job information used in an embodiment of the present invention.

FIG. 14 is a diagram showing an example of work information used in an embodiment of the present invention.

FIG. 15 is a diagram showing an example of information stored in work priority storage unit.

FIG. 16 is a diagram showing an example of information stored in equipment information storage unit.

FIG. 22 is a diagram showing an example of assembly information used in an embodiment of the present invention.

FIG. 23 is a diagram showing an example of work information used in an embodiment of the present invention.

FIG. 24 is a diagram showing an example of information stored in the equipment information storage unit.

DESCRIPTION OF THE PREFERRED EMBODIMENTS

A first embodiment of the present invention will be described with reference to FIGS. 1 to 10.

First, a product, a product in process, a part and a material are defined collectively as a "work", and a group of working machines is defined as "cells".

Figure 1:
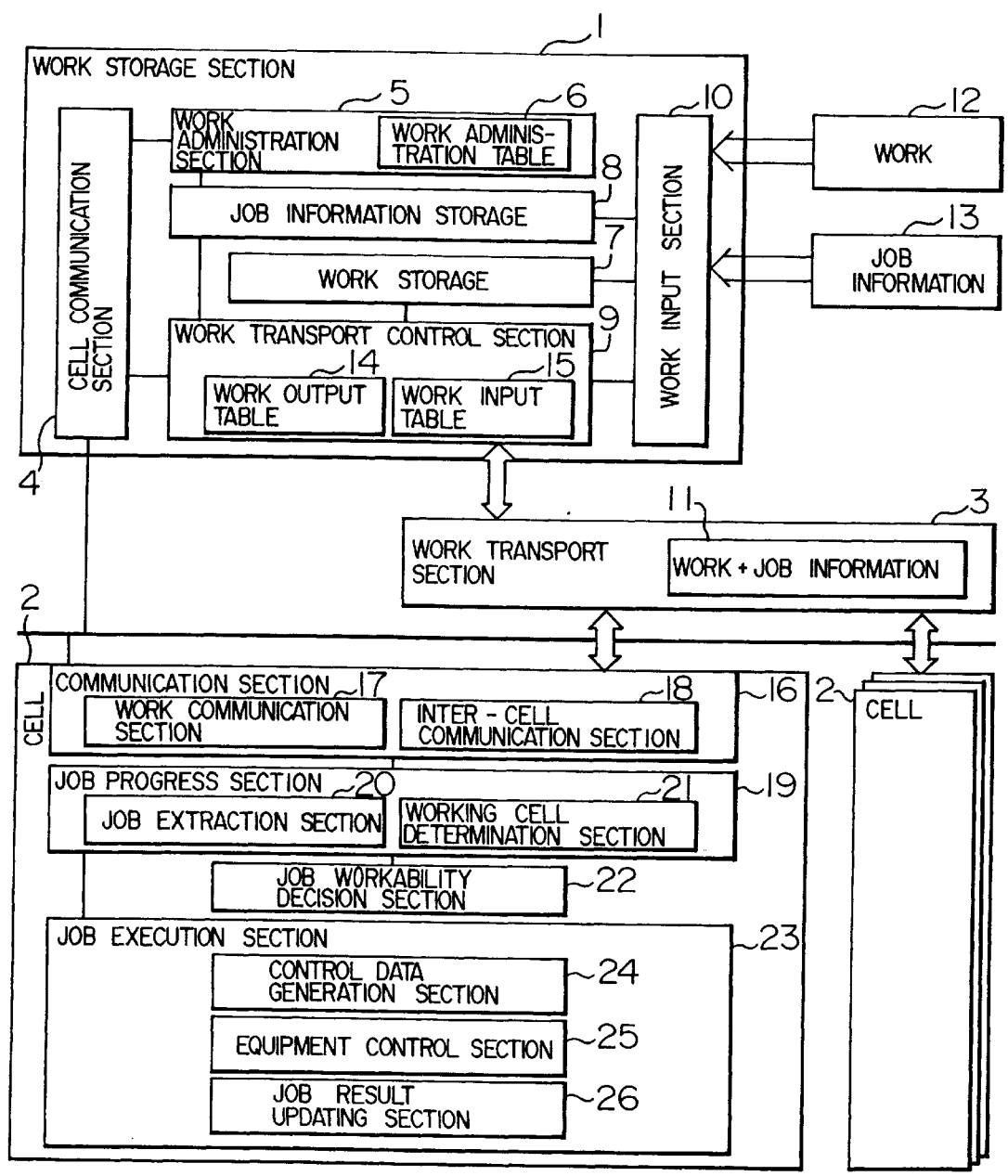
FIG. 1 is a diagram showing a general configuration of a production control system according to an embodiment of the present invention.

FIG. 1 shows a general configuration of an autonomous and decentralized production control system.

This production control system comprises a work storage section 1 for administering a plurality of works intended for job performance and controlling the work transport to cells, a plurality of cells 2 for conducting the required job on the works, and a work transport section 3 for transporting the works between the work storage section 1 and the cells 2.

First, the work storage section 1 will be described.

The work storage section 1 includes a cell communication section 4, a work administration section 5, a work storage 7, a job information storage 8, a work transport control section 9, and a work input section 10.

The work input section 10 serves as a gate for the work 12 charged and stores the work 12 in the work storage 7 or the job information 13 relating to the job required for the work 12 in the job information storage 8.

The work storage 7 is for storing the work 12 ready for job performance charged into the system through the work input section 10.

The job information storage 8 is for storing the information on the job required for each work charged into the system, i.e., the job information 13 input through the work input section 10. The job information 13 will be described in more detail later.

The work administration section 5 has the functions to uniformly administer the work 12 stored in the work storage and the job information 13 (which is stored in the job information storage 8) relating to the job required for the work 12 in accordance with the work administration table 6 contained therein and to control the order of charging the works into the cells 2. More specifically, in response to a demand from the cell 2, a work 12 high in priority is selected, and a copy of the job information 13 for the particular work 12 is transmitted through the cell communication section 4 to the cell 2 acting "chairman" as described later. The work administration section 5 has also the function to order the work transport control section 9 to transport the work 12 and the job information 13 to the cell 2 (which acts as a "person in charge" as described later) actually executing the job on the work 12. The work administration table 6 will be explained in detail later.

The function of the cell communication section 4 is to exchange information on the works with each of a plurality of cells 2.

The work transport control section 9 is for transporting units of the work and the job information 11 the work transportation section 3 between the work storage section 1 and the cell 2. The work input-output control is effected on the basis of the work output table 14 and the work input table 15 contained in the work transport control section 9. These tables will be described more in detail later. Now, the cell 2 will be explained.

Different cells 2 according to the present embodiment have different jobs executable thereby.

Upon completion of a job taken charge of by itself, the cell 2 receives a new job information from the work storage section 1. The cell 2 does not execute the job in its direct form, but decides whether the job can be executed by other cells 2. The feature of the cell 2 is that it has the function to determine a cell 2 most suitable for executing the particular job, i.e., a cell 2 which may be called "a person in charge". In other words, after completion of a job before finding a job considered most suitable for its own direct execution, the cell 2 acts as "chairman" for determining a "person in charge".

Specifically, the cell 2 mainly includes a communication section 16, a job progress section 19, a job workability decision section 22 and a job execution section 23.

The communication section 16 is further divided into a work communication section 17 and an inter-cell communication section 18, which communicate with the work storage section 1 and other cells 2, respectively. The communication section 16 is connected to the cell communication section 4 and the communication cell 16 of other cells 2 by cable or the like.

The job progress section 19 outputs a "work demand" for demanding a new work from the work storage section 1 upon completion of a job that has thus far been executed by the job execution section 23. A copy of the job information 13 is sent from the work storage section 1 through the cell communication section 4 in response to the demand. The job progress section 19 extracts a job yet to be executed from the copy and makes inquiry to other cells through the inter-cell communication section 18 as to whether the particular job is executable or not. Another function of the job progress section 19 is to determine an actual cell 2 which executes the job thus extracted, on the basis of the answer from other cells 2. The job progress section 19 has a job cell determination section 21 and a job extraction section 20* A job yet to be executed is extracted by the latter. The functions including output of a "work demand", inquiry to other cells 2 and determination of an actual cell 2 executing the job are effected by the job cell determination section 21.

The job workability decision section 22 has the function to decide whether a job to be performed on a work is executable or not as compared with the specification of the particular cell 2 upon receiving an inquiry on job executability. The job workability decision section 22 has therein a specification or the like data on the cell 2 required for decision. Other data not contained therein such as the time of job completion is confirmed by making inquiry to the job execution section 23.

The job execution section 23 is for actually executing a job. The job execution section 23 is further divided into a control data preparation section 24, an equipment control section 25 and a job result updating section 26.

The control data preparation section 24 is for preparing data and a program for a cell controller and various equipment making up the cell 2 as required for the cell 2 to perform a requested job.

The equipment control section 25 controls the equipment making up the cell 2 by use of the data and the program prepared at the control data preparation section 24 and conducts the job on the work 12.

The job result updating section 26 writes the job result such as job completion into the job information 13 at the end of job execution on the work 12.

Each cell 2 is assigned with a cell number for identification.

Now, the work transport section 3 will be described.

The work transport section 3 transports the work stored in the work storage 7 and the job information stored in the job information storage 8 to the cell 2, i.e., the "person in charge" for performing an actual job, under an instruction from the work transport control section 9. More specifically, the work transport section 3 transports not only a work but also a storage medium storing the job information 13. The work and the job information 11 transported by the work transport section 3 are processed by the job execution section 23 of the cell 2.

Now, the various tables described above will be summarized below.

First, reference is made to the job information 13, which represents the contents of one or more jobs conducted on a work 12 and the corresponding job procedure.

FIG. 2 shows an example of the job information 13.

The work number 201 is the number of the work intended for job performance described in the job information 13.

A job completion 202 indicates whether or not the jobs designated in the job information 13 are all complete.

A work shape 203 is data indicating the shape of the work before job initiation. In the case where the work has a shape as shown by the side view (showing only the upper part from center) in FIG. 3A, for example, data required for recognition of the same by the cell 2, such as (length: 1000 mm, radius: 100 mm, round steel bar) is described.

The number of jobs 204 is that of jobs required to be conducted on the work 12, which is naturally followed by the job contents 205 which number as many as indicated by the number of jobs 204. According to the present example, two jobs including "job 1" and "job 2" in job identification number are performed.

The job contents 205 includes a job name 205*a* at the head thereof. The job name 205*a* has described therein the job name representing a job type. The job name is defined in advance with the cell 2, etc., which is adapted to discriminate the job type in accordance with the job name. A parameter corresponding to the job is described as the succeeding information.

Since "job 1" in this example has a job name "rough machining", for instance, the accuracy 205*b* and the processing shape 205 are provided as parameters. In this example, therefore, the cell 2 decides according to these parameters that the work should be roughly machined to the shape shown in FIG. 3B, i.e., 600 mm in the length of the large-diameter portion, 80 mm in radius and 400 mm in the length of a small-diameter portion (55 mm in radius).

In the "job 2" of this example, the job name is "finish machining", and therefore the accuracy 205*b* and the processing shape 205*c* are provided as parameters. On the basis of these parameters, the cell 2 decides in this example that the work should be finish machined up to a shape as shown in FIG. 3C (a two-stage shaft 75 mm in the radius of a large-diameter portion and 50 mm in the radius of a small-diameter portion).

Further, the number of preceding jobs 205*d* and the preceding job 205*e* are Provided after the Parameters representing the job contents.

The number of preceding jobs 205*d* is the number of jobs required to have been completed before starting a particular job. The preceding jobs 205*e*, on the other hand, include all the identification numbers of the jobs required to have been completed before starting a particular job.

In the case of conducting a plurality of jobs on the work 12, a partial order of priority holds in view of the fact that there is an order of priority for jobs of some types. Such jobs have an identification number of a job that is required to have been completed in order of priority, indicated as the preceding job 205*e*.

In the example under consideration, the job 2 (finish machining) is required to be conducted after the job 1 (rough machining). The number of jobs 205*d* preceding to the job 2 is indicated as "1", and the preceding job 205*e* as "job 1". In the absence of the job to be previously conducted in order of priority, the number of preceding jobs 205*d* is indicated as "0" as shown in the job 1. No column of the preceding job 205*e* is provided.

The job completion 205*f* at the end of the job contents 205 is indicative of whether the particular job has been completed or not. It is necessary before starting with a given job that the job completion 205*f* of every job indicated in the preceding job 205*e* is required to indicate completion. In this example, the indication is "NO" for both jobs 1 and 2, showing that neither of the jobs is complete.

Although FIG. 2 represents an example of job information for the machining job, a substantially similar format is also used for the assembly work.

The job information 13 described above is an example and is not limited to the construction described.

Now, the work administration table 6 will be explained.

The work administration table 6 according to the present embodiment is comprised of a work number 210, a work condition 211, an order of charging 212, a delivery time 213 and an order of priority 214, as shown in FIG. 4.

The work number 210 is the number of the work charged into the system, and is almost the same value as the work number 201 of the job information 13.

The work condition 211 represents the condition of a work in the system, and includes "ready for job performance" in the work storage 7 of the work storage section 1 and "under job performance" indicating that the job is being conducted at the cell 2. The work condition 211 is indicated as "ready for job performance" at the time point when the work 12 is charged into the system. Upon determination of the work 2 on which the job is to be performed, the work condition 211 is changed to "job in process". Even when a particular job is complete, the work is restored in the work storage 7 with the work condition 211 of the corresponding record indicated as "ready for job performance", if there remains any job yet to be completed.

The order of charging 212 is the order in which works are charged into the system.

The delivery time 213 is the dead line by which a work is required to be delivered out of the system.

The order of priority 214 indicates the order in which works are required to be delivered out to the cell 2, the works with a smaller number being given a higher priority. According to this example, three items including the order of charging 212, the delivery time 213 and the order of priority 214 are used as indexes for determining the order of priority of a job.

Each work 12 is registered with the work administration table 6 at the time of being charged into the system. When the job at the cell 2 is ended with all the required jobs for the work complete, the work is delivered out of the system and the corresponding record in the work administration table 6 deleted.

Now, explanation will be made about the work output table 14 and the work input table 15.

Figure 5:
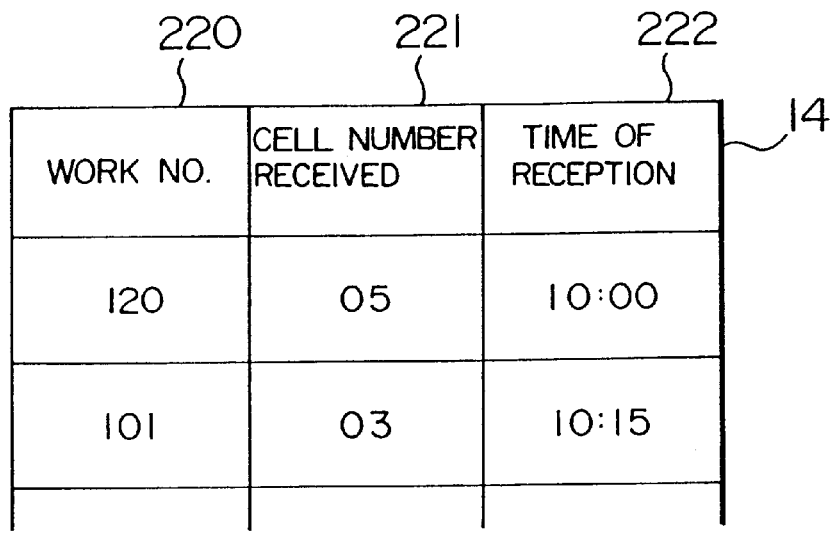
FIG. 5 is a diagram showing an example of a work output table.

The work output table 14 according to the present embodiment is shown in FIG. 5.

This work output table 14 is configured of a work number 220, an inward delivery cell number 221 and an inward delivery time 222.

The work number 220 corresponds to the work number 210, etc. in the work administration table 6 and the like. The received cell number 221, on the other hand, is described by use of a cell number for identifying the cell 2 described above.

In the example shown, the work of the work number 120 is shown to be received at 10 o'clock into the cell 2 of the cell number 05. It is also shown that the work of the work number 101 is received into the cell 2 of the cell number 03 at 15 minutes past 10 o'clock.

Figure 6:
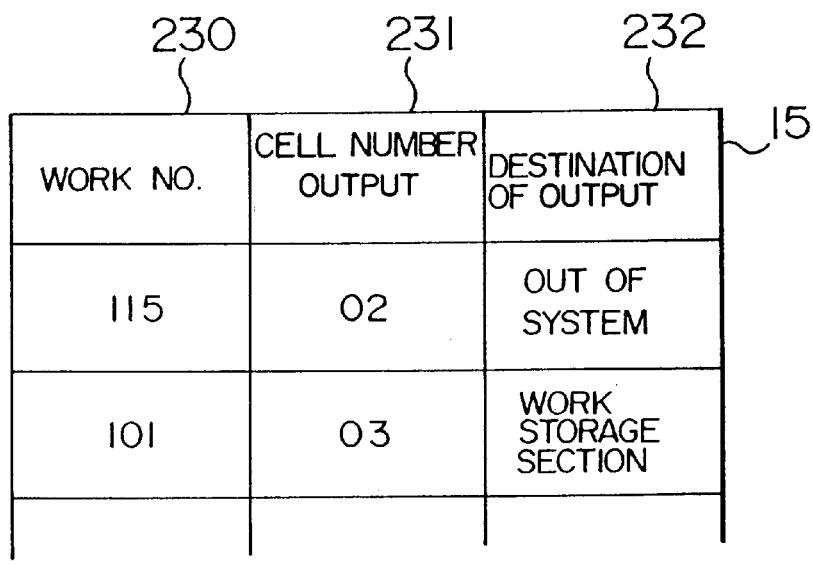
FIG. 6 is a diagram showing an example of a work input table.

The work input table 15 according to the present embodiment is shown in FIG. 6.

This work input table 15 includes a work number 230, an output cell number 231 and a destination for output 232.

The work number 230 is the number of the work on which the job has been completed.

The outward delivery cell number 231 is the number of the cell 2 that issues a message "job completion" and demands output of the work 12.

The output destination 232 is the destination to which the work 12 is delivered out. The items "out of system" and "work storage section" are included in the destination.

Now, explanation will be made about the operation of each section performed from delivery of the work 12 into the production control system to output out of the same system.

Main processes in the work storage section 1 include the output of the work into the cell 2 and the reception of the work from the cell 2. The determination of a cell 2 for executing a process and an actual job execution process at the cell 2 are also included in the main processes. These processes will be described one by one below.

Figure 7:
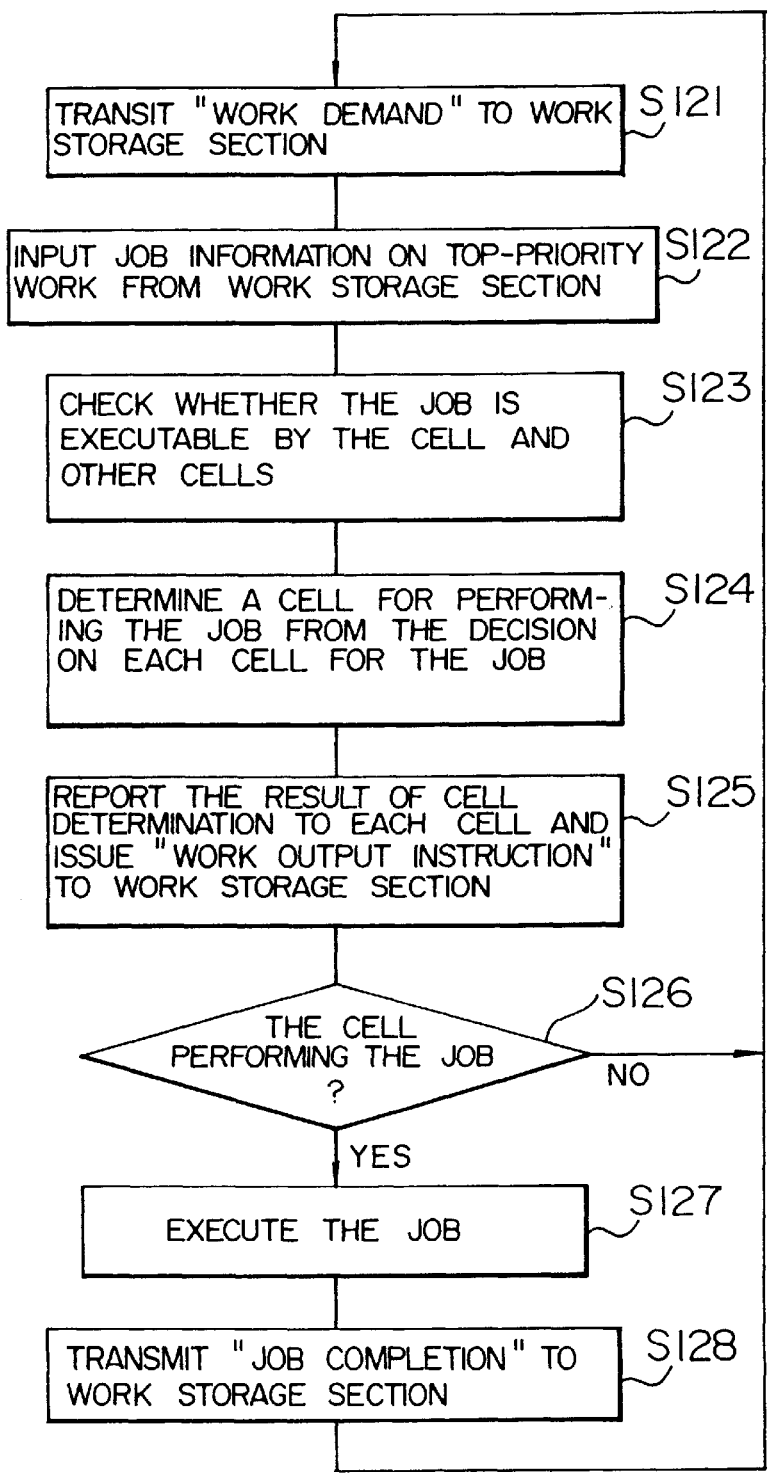
FIG. 7 is a flowchart of Procedures in cells.

First, the flow of processing operations in the cell 2 will be described with reference to FIG. 7. (Step S121) When the cell 2 has completed all the jobs taken charge of and is not yet assigned with other jobs, the job cell determination section 21 transmits a "work demand" message from the work communication section 17 to the work storage section 1 to demand a work. The cell 2 thus subsequently accomplishes the function as "chairman".

(Step S122) In response to the above-mentioned process, the work storage section 1 sends back a copy of the job information 13 representing the top-priority works determined according to a certain index from among the works 12 ready for job performance in the work storage 7. The wording "a certain index" indicates the order or priority determined by the order of charging 212, the delivery time 213, etc., described in the work administration table 6, as will be explained in detail later.

In the case where the work storage section 1 is processing the message "work demand" transmitted from other cells 2, the message "other work being processed" is sent back. Therefore, the message "work demand" is transmitted again.

(Step S123) The job cell determination section 21 extracts the job contents 205 not yet complete as indicated in the job completion 205f, i.e., the jobs not yet executed, from among the jobs described in the copy of the job information 13 sent from the work storage section 1 (on condition that the jobs 205e preceding the particular job are all complete as indicated in the job completion 205f).

Then the job workability decision section 22 of each cell 2 is referred to as to whether the particular job is executable or not. This inquiry is made direct to the job workability decision section 22 of other cells 22 from the cell 2 by use of the intercell communication section 18. The inquiry is made not by sending all the job information shown in FIG. 2 as an example, but by transferring only the job contents 205 about the job extracted by the job extraction section 20.

(Step S124) The job workability decision section 22 of each cell 2, by comparing the specification of the cell 2 associated therewith and the job condition with the contents of the requested job, gives an answer to the request from the "chairman" in the form of "the job is unexecutable" or "the job is executable" (with such information as the possible starting time, scheduled completion time, possible number of jobs, and the rate of operation). The result of decision at the job workability decision section 22 of each cell 2 is returned through the inter-cell communication section 18 or directly from other cells 2 acting as "chairman".

Upon returning of the answer from all the job workability decision sections 22, the job cell determination section 21 of the "chairman" determines the cell 2 to perform the job. As an index for this determination, a cell having the earliest scheduled time of completion is determined among the workable cells 2. Also, a cell with a minimum number of executable job types (Note: The types of executable jobs are different among cells having different specifications) or the lowest rate of operation may be selected from among the immediately workable cells.

(Step S125) The job cell determination section 21 reports a cell 2 for executing a particular job, i.e., a "person in charge" to each cell 2 through the inter-cell communication section 18. The "person in charge" tries to proceed with the job in compliance with the starting time and the scheduled completion time reported with the job executability. The job cell determination section 21 also reports the starting time and the "person in charge" to the work storage section 1, and issues a "work output instruction" through the work communication section 17 in such a manner as to deliver the intended work 12 to the "person in charge" by the starting time.

(Step S126) In the case where another cell 2 is determined as a cell 2 to conduct the job, i.e., where the "chairman" fails to become a "person in charge", the process is returned to step S121 for transmitting the message "work demand" to the work storage section 1 again. When the "chairman" becomes a "person in charge", on the other hand, the process proceeds to step S127.

(Step S127) The "chairman" who has become the "person in charge" performs the job by way of the job execution section 23 as soon as the intended work and the job information 11 are transported by the work transport section 3. Also, the cell 2 that has thus been the "chairman" ceases to be so at this time point.

(Step S128) Upon completion of the job by the job execution section 23, the job result is recorded in the job information 13 in the job execution section 23 and the job extraction section 20 checks to see whether all the jobs for the work are complete by way of the job information 13. The result of this check, together with the job information 13 and the message "job completion" as well as the work 12, is returned to the work storage section 1 (which is delivered outside of the system if all the jobs are complete), and, in parallel to this, the job completion message and the like are transmitted through the cell communication section 4.

The cell 2 then executes other jobs upon arrival of the work for the particular jobs if in charge of such other jobs. In the case where the cell 2 is not in charge of other cells at all, on the other hand, the process is returned to step S121 and the office of "chairman" is assumed to repeat similar processes.

In the case where other jobs remain for the work on which a given job has been completed, the work is stored again in the work storage section 1 and waits for the next job. In the case where all the jobs for the work 12 are complete, by contrast, the work is delivered out of the system to end the processes for the work 12.

Figure 8:
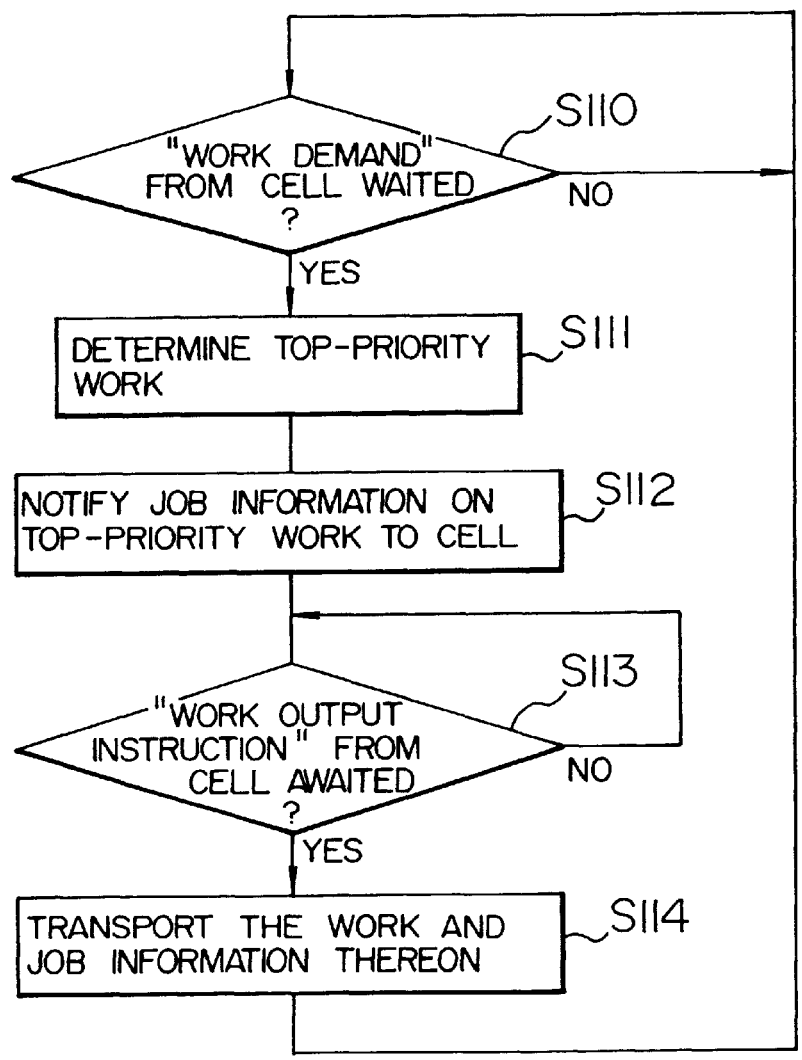
FIG. 8 is a flowchart of procedure for delivering works out into cells.

A flow of the process of outward work delivery to the cell 2 will be explained with reference to FIG. 8.

(Step S110) The cell communication section 4 for communicating with each cell 2 waits for the arrival of the message "work demand" from any of the cells 2. The message "work demand" is for the cell 2 to demand the receipt of one of the works ready for job performance and is issued at the step S121 in FIG. 7. With the arrival of a message, it is interpreted appropriately. When the message is "work demand", the process 1S passed to step S111. If the message is not "work demand", by contrast, the message "work demand" continues to be waited for.

(Step S111) The cell communication section 4 demands that the work administration section 5 determine a work to perform a job in top priority from among the works ready for job performance (the work itself is stored in the work storage 7 and the related job information in the job information storage 8).

The work administration section 5 then determines a top-priority work. This determination is made in the work administration table 6 shown in FIG. 4 in accordance with a predetermined index from among the works in the work condition 211 ready for job performance.

When the order of charging is used as an index, top priority is placed on the work of the work number 102. When the ascending order of lead time is referred to, on the other hand, the work of the work number 105 is selected in top priority. In similar fashion, when the order of priority 214 in some other category is used, the work of the work number 103 is given top priority.

Apart from the order of charging, lead time and the order of priority in some other category used as an index for determining the order of job priority above, other items may be cited in the work administration table 6 as an alternative index for determining the order of job priority. Also, an index for determining the order of job priority may be programmed or expressed as a rule.

(Step S112) The work administration section 5 takes out a copy of the job information relating to top priority works from the work job information storage 8, and notifies the "chairman" through the cell communication section 4. The job information 13 has already been described with reference to FIG. 2.

(Step S113) The cell communication section 4 waits for the arrival of information such as "chairman" and the message "work output instruction" from the cell 2. With the arrival of such information, the process is passed to step S114.

(Step S114) The cell communication section 4 registers the reception cell number and the receiving time in the message with the work output table 14 in FIG. 5. The work transport control section 9 transports a designated work and job information 11 to a designated cell, i.e., the "person in charge" by use of the work transport section 3 at a designated time in accordance with the work output table 14. Upon completion of the transport, a corresponding record is deleted from the work output table 14.

During the period from receipt of the message "work demand" from a given cell 2 to the determination of a cell 2 as a work destination, the cell communication 4 rejects any message "work demand" from other cells 2 by returning the message "other works in processing" indicative of unacceptability. Only upon completion of a series of processes shown in FIG. 8, is the next message "work demand" accepted.

Figure 9:
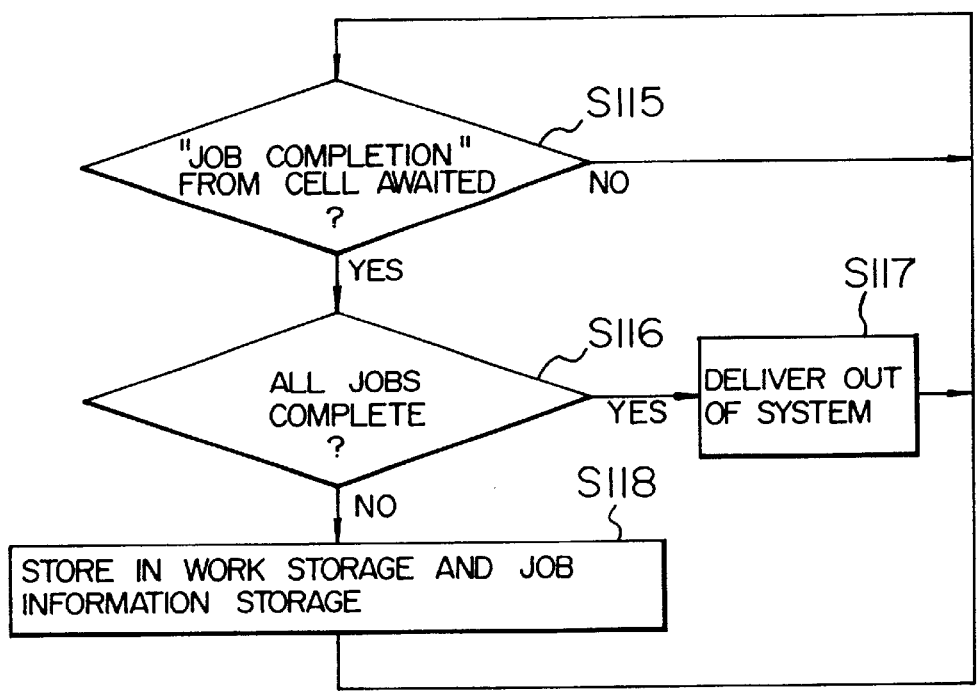
FIG. 9 is a flowchart of procedure for receiving works from cells.

Now, the flow of the process of work reception from the cell 2 will be explained with reference to FIG. 9.

(Step S115) The cell communication section 4 waits for the arrival of the message "job completion" from the cell 2. With the arrival of this message, the process proceeds to step S116.

[Step S116] The cell communication section 4 interprets the message "job completion" from the cell 2, which is of two types: one associated with the completion of all jobs required of the work 12, and the other concerning the case in which a job remains incomplete. The process is passed to step S117 in the former case and to step S118 in the latter.

(Step S117) The work 12 is output out of the system.

(Step S118) The work and the job information 11 are stored again in the work storage 7 of the work storage section 1 and the job information storage 8, with the process returning to step S115.

The delivery of the work 12, etc. out of the system and the storage thereof into the work storage section 1 are effected by use of the work input table 15. This operation will be briefly explained.

The cell communication section 4 interprets the message "job completion", and adds a record to the work input table 15. The work transport control section 9, on the other hand, keeps the work input table 15 monitored, and upon addition of a record, causes the work transport section 3 to transport a work in accordance with the record. Upon completion of the transport, the record is deleted from the work input table 15.

Figure 10:
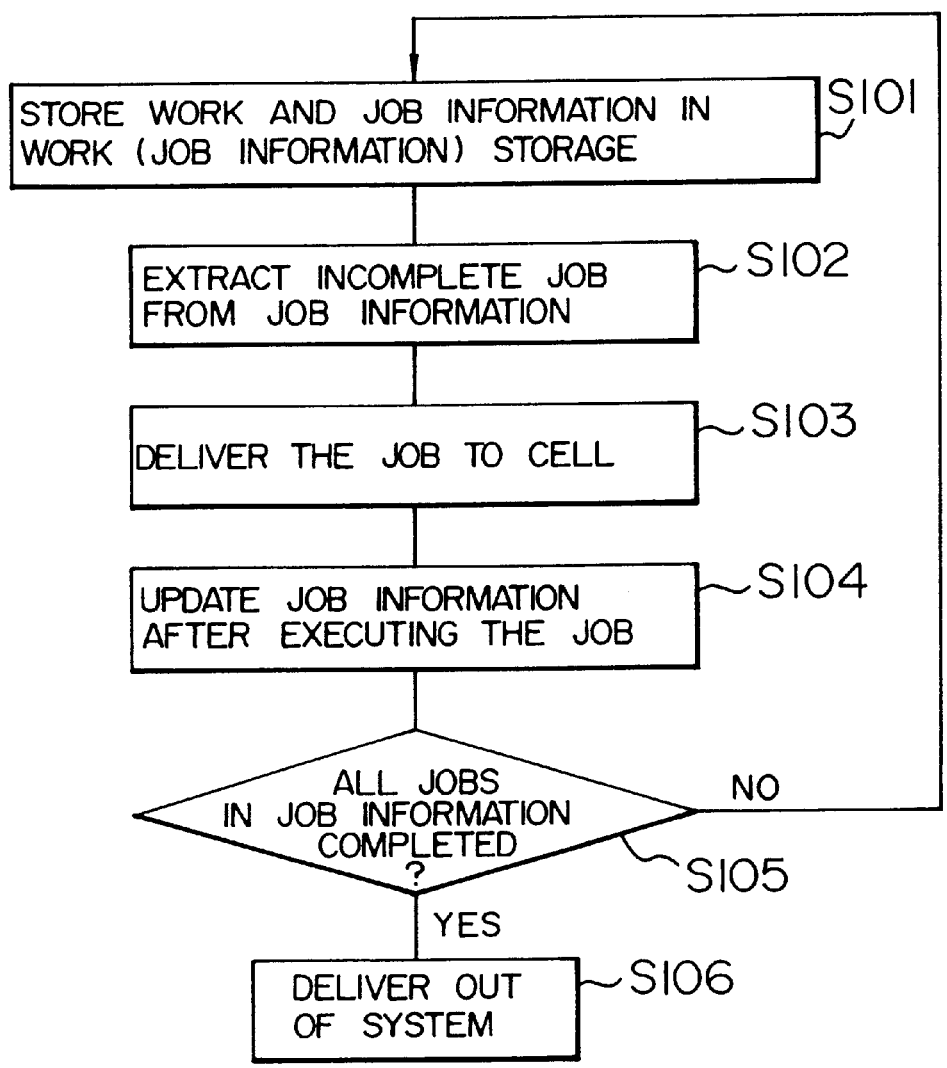
FIG. 10 is a diagram schematically showing the procedure conducted on a work.

Now, the operation performed for the work 12 will be explained from the viewpoint of the work 12. FIG. 10 is a flowchart showing an outline of such operation.

(Step S101) The work intended for a job is stored in the work storage 7. At the same time, the job information 13 relating to the job to be performed on the work 12 is stored in the job information storage 8.

(Step S102) A copy of the job information 13 for the top-priority work is sent to the "chairman" in response to the "work demand" from the cell 2 to assume "chairmanship".

The "chairman" then determines the job required for the work 12 from the copy of the job information 13. By extracting incomplete jobs from the copy with reference to the job completion column 205f or otherwise, a "person in charge" is determined. Information including the "person in charge" is transmitted to the work storage section 1.

(Step S103) The work 12 and the job information 13, as a work and job information 11, are transported by the work transport section 3 to the cell 2 executing the job determined and extracted by the cell 2, i.e., the "person in charge".

(Step S104) The "person in charge" executes the job on the work 12. Upon completion of the job, the job completion 205f of the job information 13 for the particular job is changed to "complete".

(Step S105) The job information 13 is referred to for checking whether the job required for the work 12 is completed or not from the job completion 205f of each job.

When there remain incomplete jobs, the process proceeds to step S101 for storing them again in the work storage 7 and the job information storage 8. When all the jobs are complete, on the other hand, the process is passed to Step S106.

(Step S106) The work is delivered out of the system.

In this way, the process of performing the job in the cell 2 and, upon completion of the job, returning it to the work storage section 1 is repeated for each job. In other words, the work continues to reciprocate between the work storage section 1 and the cell 2 until all jobs are completed.

According to the present embodiment, the work storage section 1 may be used to control the order of charging the work 12 into the cell in accordance with a certain rule, and therefore the requirement for performing a job of urgent necessity can be met while at the same time improving the effect of meeting the delivery time.

Each job is performed in the cell 2 by checking the workability of the particular job by all the cells. For example, a job is assigned to the cell 2 capable of performing the job at the earliest time, resulting in an improved work efficiency. Also, in view of the fact that the job workability decision section 2 for deciding the workability of a job and the job progress section 19 are provided in each cell 2 and a "person in charge" is determined by the cell 2, an addition or malfunction of a cell 2 is met easily without any action taken on the work storage section 1. Further, an arrangement, if necessary, of cells having different functions as in the assembly work can be met.

According to the present embodiment, a work and the information relating to a job required for a work are divided into the work storage 7 and the job information storage 8 and collectively controlled by the work administration section 5. As an alternative, the required job information may be added directly to the work to combine the work storage 7 and the job information storage 8.

Also, the job information 13 may be exchanged through the cell communication section 4 without using the work transport section 3.

Further, a monitor section for detecting a fault of the cell by monitoring the job execution at the cell may be added. In the case where a job is not yet complete even after the lapse of a scheduled job completion time, for example, the cell 2 is judged as being faulty. Such a monitor section may be inserted either in each cell 2 or the work storage section.

A second embodiment of the present invention will be described.

Figure 11:
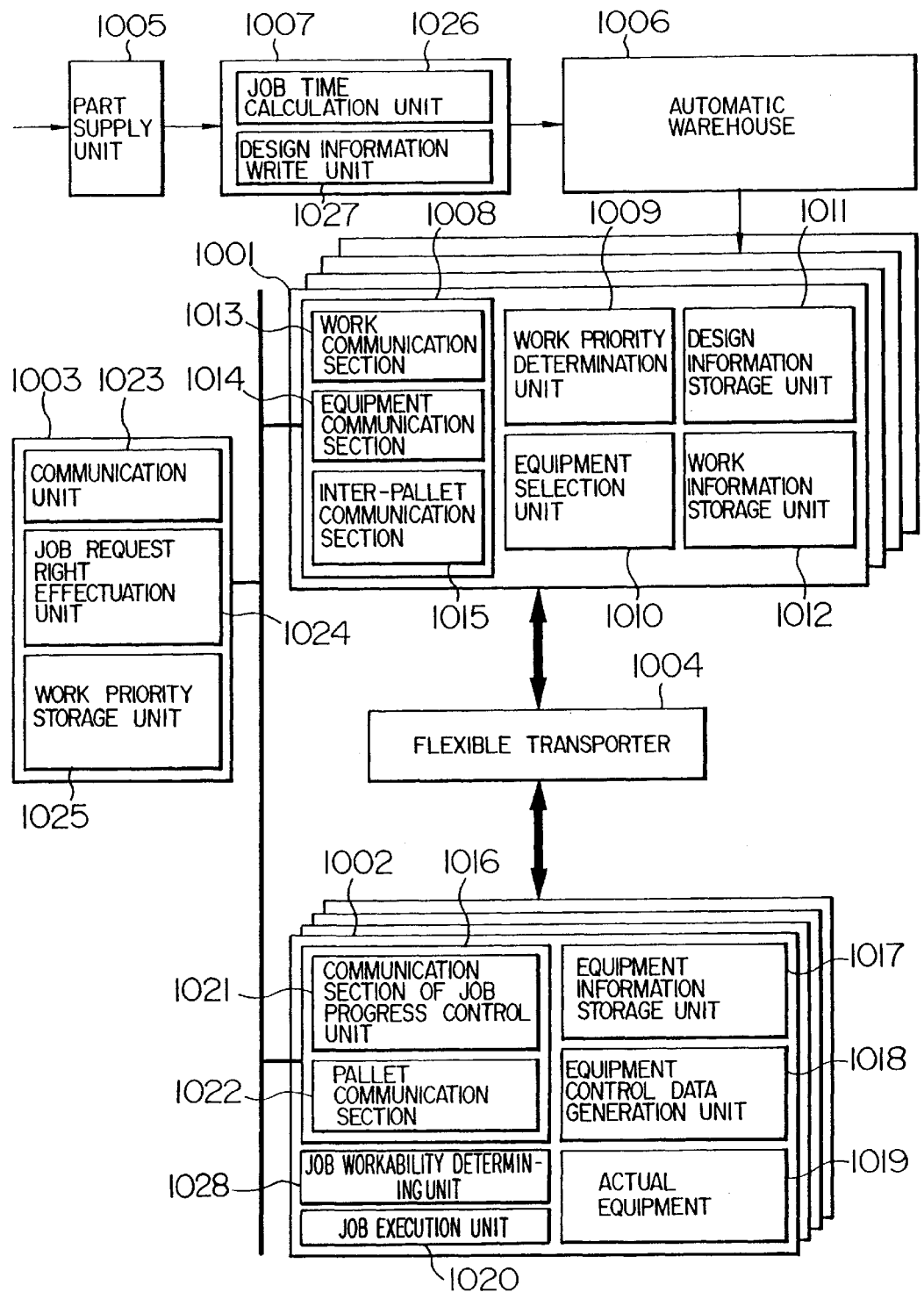
FIG. 11 is a diagram showing a configuration of a production control system of work driven type according to an embodiment of the present invention.

FIG. 11 is a diagram showing a configuration of a production control system of work driven type according to an embodiment of the present invention. The production control system comprises a pallet 1001 for controlling the transport of a work, etc. in the system, a production equipment 1002 (hereinafter referred merely as "the equipment") for receiving a job from the pallet 1001 and actually performing the job, a job progress control unit 1003 for controlling the progress of a job on the work, a flexible transport unit 1004 for delivering a given pallet 1001 to one given equipment 1002 in compliance with an instruction from the pallet 1001, a part supply unit 1005 for supplying a work to the pallet 1001, an automatic warehouse 1006 for housing a work placed on the pallet 1001 from which a given work is deliverable at a given time, and a design information write unit 1007 for writing the contents of a job for the work in the pallet 1001.

The pallet 1001 is configured of a communication unit 1008 for exchanging information with the pallet 1001, a plurality of equipment 1002 and the job progress control unit 1003, a work priority determination unit 1009 for recalculating the order of priority of a work held at the end of a job, an equipment selection unit 1010 for determining the equipment which performs the next job of a work held thereby in negotiation with the equipment, a design information storage unit 1011 for storing the design information of a work, and a work information storage unit for storing the job history and the work condition. The communication unit 1008 affects communications by way of a communication medium (such as radio communications) capable of broadcast communication. The communication unit 1008, on the other hand, is comprised of a work communication section 1013, an equipment communication section 1014 and an inter-pallet communication section 1015 depending on the other party of the information exchange.

The equipment 1002 includes a communication unit 1016 for exchanging information with the pallet 1001 and the job progress control unit 1003, an equipment information storage unit 1017 having a relative performance for accuracy, speed, etc., a job workability decision unit 1028 for determining whether a job is executable or not on the equipment, an equipment control data generation unit 1018 for preparing an NC data from the work design information, a job execution unit 1020 for executing a job by applying the NC data obtained from the equipment control data generation unit 1018 to the actual equipment 1019, and actual equipment 1019 for executing the actual job and acting on a work.

The job progress control unit 1003 includes a communication unit 1023 for communicating with the pallet 1001, a job request right effectuation unit 1024 for granting a job request right to the pallet 1001 and a work priority storage unit 1025 for storing the order of priority of all the works.

According to the present embodiment, it is suggested that the flexible transport unit 1004 uses an automatic transporter and a stripe of lines. To the extent that a given pallet 1001 is capable of being carried to a given equipment 1002, however, any type of transporter may be used with equal effect. A doubleloop construction with the capability to outrun other pallets 1001 is an example. Also, a pallet 1001 equipped with a drive unit is expected to have the same effect as an automatic transporter.

The design information write unit 1007 includes a job time calculation unit 1026 for calculating and predicting the maximum time of a job on a work and a design information write unit 1027 for writing the design information and the above-mentioned predicted job performance time in the pallet 1001.

The system according to the present invention is configured of the parts described above.

Figure 12:
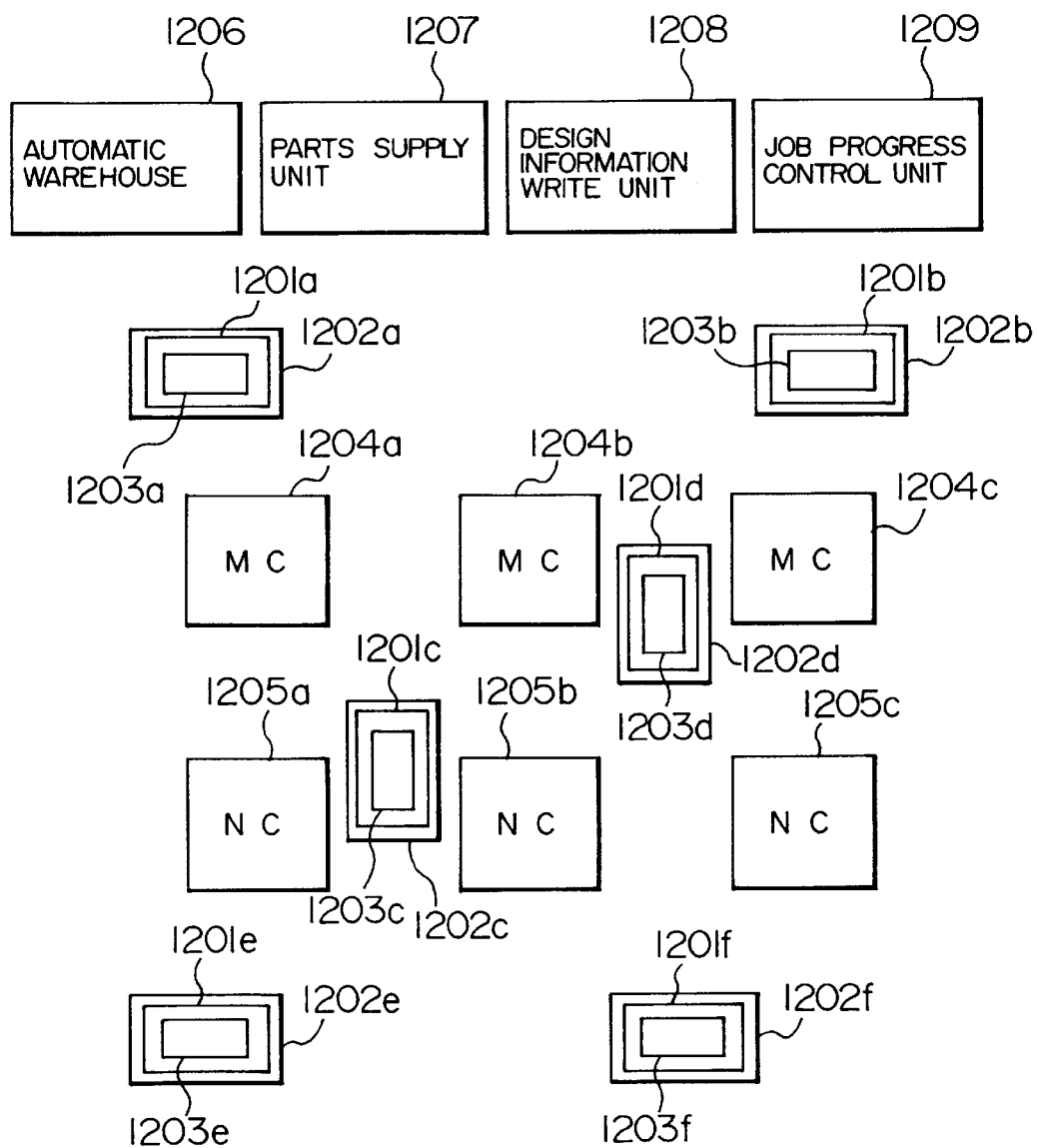
FIG. 12 is a diagram showing a configuration according to an embodiment of the present invention in a processing job.

Take the machining work as an example. FIG. 12 shows a configuration for machining work according to an embodiment of the present invention. This machining system includes machining contents 1204a to 1204c for performing actual machining work, NC lathes 1205a to 1205c, works 1203a to 1203f providing workpieces, pallets 1201a to 1201f for controlling the transport of the work 1203 placed thereon, automatic transporters 1202a to 1202f for carrying the work 1203 to given equipment in compliance with an instruction from the pallet 1201, an automatic warehouse 1206 from which a given work 103 is deliverable at a given time in accordance with an instruction from the pallet 1201, a parts supply unit 1207 for placing a work 1203 on the pallet 1201, a design information write unit 1208 for writing the design information for the work 1203 into the pallet 1201, and a job progress control unit 1209 for controlling the progress of the job on the work 1203.

FIG. 13 shows an example of design information stored in the design information storage unit 1011. This information is a description of the contents of individual jobs and the order of a plurality of jobs performed on a work. The work number 1301 is an identifier for discriminating individual works in the present system and is specific to each work. The job completion flag 1302 is for indicating whether all the jobs on a work are complete or not. The work shape 1303 is information representing the shape of a work before job performance. For example, the work is a round steel bar 1000 mm long and 100 mm in radius as shown in (A) of the side view of FIG. 3 (only the upper portion from the center shown). The number of jobs 1304 indicates the number of all the jobs performed on a work. The predicted maximum job time 1305 is information used for determining the order of priority of a work, and the time required for using the equipment slowest in the speed of operation is calculated in advance by the job time calculation unit 1026 and stored. The delivery time 1306 is the lead time of the work.

The initial information on a work is mentioned above and is followed by the numerical job information on the number of jobs 1304. The job number 1307 provides an identifier for discriminating the jobs on a work. This identifier is unique to a job, but is not necessarily indicative of the order of job performance. The job completion flag 1306 is indicative of whether a particular job is completed or not. The preceding job number 1309 represents a job required to have been completed before a particular job, and is used for indicating the order of performance of all the jobs. The accuracy 1310 indicates the demanded accuracy of a job, by use of which the job execution equipment can be reduced. The machining shape 1311 indicates a shape of a work after job performance. In this example, as seen from the preceding job 1309, the job 1 performs the rough machining as shown in FIG. 3B, followed by the job 2 for finish machining as shown in FIG. 3C.

An example of the work information stored in the work information storage unit 1021 is shown in FIG. 14. This is information representing the work condition at the time of completion up to a given job. The work number 1401 is the same as the work number 1301 and is unique to the work in the present system. The work shape 1402 represents the shape of a work at the above-mentioned time point, and the shape after completion of the job in this example. The residual number of jobs 1403 is the number of jobs remaining at the above-mentioned time point. The predicted maximum residual job time 1404 is a predicted maximum job time required to perform the remaining jobs at the above-mentioned time point. This is obtained by subtracting the actual job time from the predicted maximum job time. The work information is configured of information described above. In the example under consideration, the condition after completion of the job 1 is indicated.

FIG. 15 shows an example of the information stored in the order of work priority storage unit 1009. The work number 1501 corresponds to the work number 1301 and the work number 1401. The order of priority 1502 represents the order of priority of each work as of a certain time point. The job-in-process flag 1503 indicates whether the work is being processed or not.

FIG. 16 shows an example of information stored in the equipment information storage unit 1017. The position 1601 is that of the equipment. This position represents an absolute one in the present system, by reference to which the automatic transporter carries the pallet 1201. The job type 1602 is the type of job specialized in by the equipment under consideration. The present example represents the NC lathe 1205a, which specializes in the axial machining. The accuracy 1205a indicates the accuracy of the equipment. In this example, the finish accuracy, i.e., the surface roughness is used as a unit. In addition, the minimum feed rate of the cutting tool may be considered the accuracy of the equipment involved. The speed 1604 indicates a relative speed resulting from comparison of the speed with that of the other equipment. The maximum size 1605 and the minimum size 1606 are indicative of the size limit of a work on which the equipment can operate. The procedure for the system to perform the jobs will be described below with reference to FIGS. 17 to 19 on the basis of the above-mentioned information.

According to this embodiment, the pallet 1201, the machining center 1204, the NC lathe 1205 and the job progress control unit 1209 proceeds with a job as a whole system under individual decisions while exchanging information therebetween. Therefore, the flow of operation is divided into three categories.

Figure 17:
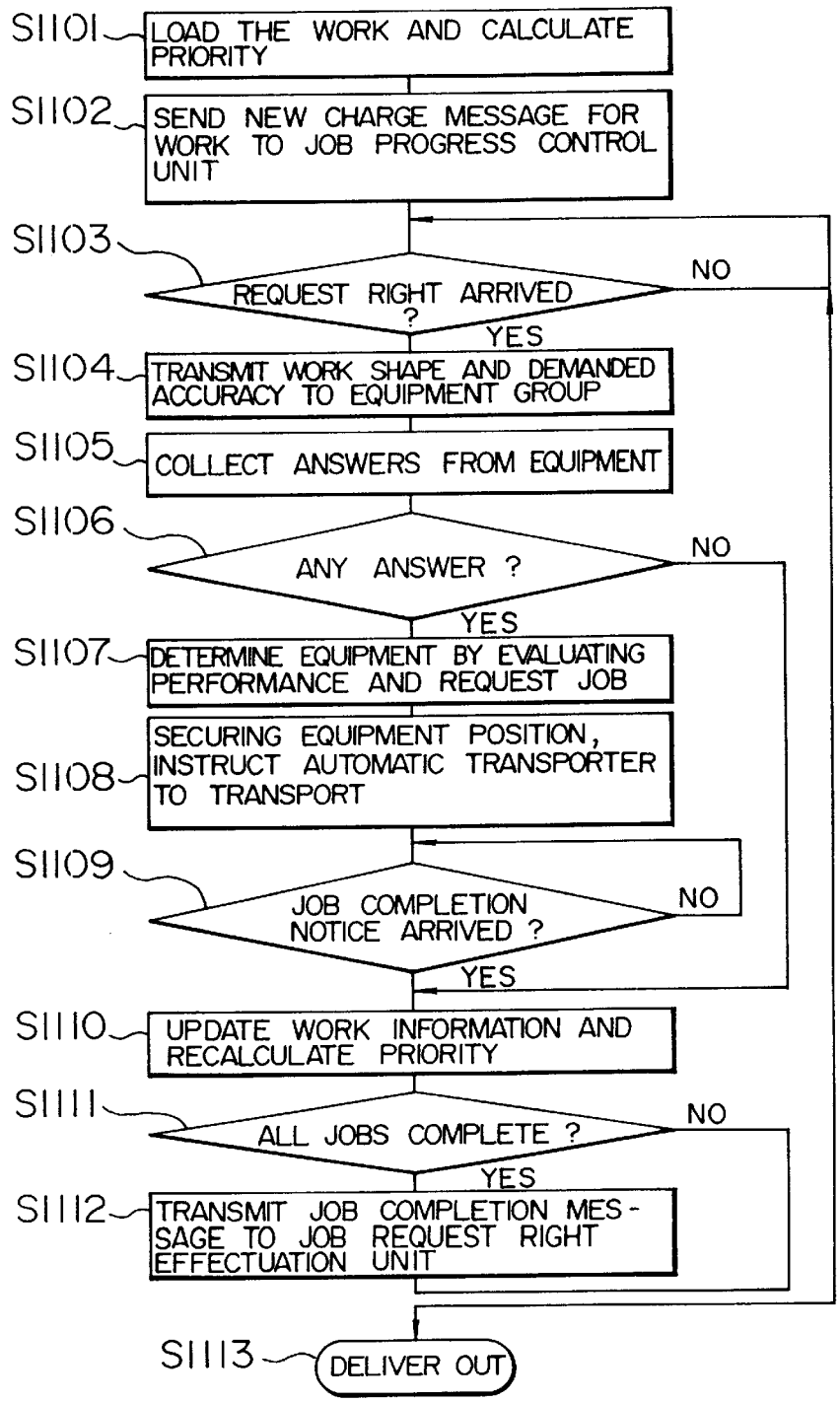
FIG. 17 is a flowchart of pallet operation.

FIG. 17 is a diagram showing the flow of operation of the pallet 1201. Step S1101: The pallet 1201 receives the work 1203 at the parts supply unit 1207 and then is leaded in the automatic warehouse 1206. The work priority determination unit 1009 calculates a priority by using the predicted maximum job time 1305 and the delivery time 1306 of FIG. 13 stored in the design information storage unit 1011.

Step S1102: The new work charging message is sent to the job progress control unit 1209 by way of the work communication section 1013. Upon receipt of this message, the job progress control unit 1209 grants the job request right to an appropriate pallet such as the pallet 1201a, as will be explained later more in detail with reference to the job progress control unit 1209 in FIG. 18.

Step S1103: This step awaits the arrival of the job request right from the job progress control unit 1209.

Step S1104: The accuracy 1310 and the machining shape 1311 of the next job to be conducted are broadcast to all the machining centers 1204 and the NC lathes 1204. Upon receipt of this message, each machining center 1204 and the NC lathe 1205 decides on the workability of the job and gives an answer to the pallet 1201a, as will be explained more in detail later with reference to FIG. 19.

Step S1105: The answers from the machining center 1204 and the NC lathe 1205 are collected. There may be a plurality of answers, and therefore the dead line is set for collecting the answers, so that the answers collected within the deadline are studied at the same time.

Step S1106: This step is for checking to see whether answers are received from the machining center 1204 and the NC lathe 1205. In the absence of an answer, it is decided that the machining center 1204 or the NC lathe 1205 capable of executing the next job on the work 1201a is absent at this time point, and a job request end notice is sent to the job progress control unit 1209.

Step S1107: Watching the speed 1604 in the answer from the machining center 1204 and the NC lathe 1205 collected at step S1105, the equipment which conducts the job at the fastest rate such as the NC lathe 1205 is selected, and a job request is sent thereto. An unemployment notice is sent to the machining centers 1204 and the NC lathes 1205 not selected. A job request end notice is sent to the job progress control unit 1209 in order to notify that the job request is ended. The job progress control unit 1209 that has received the notice sets the job-in-process flag 1503 in "job-in-process", as will be explained more in detail later with reference to FIG. 18. The NC lathe 1205a that has received a job request, on the other hand, notifies its own position as an answer to the pallet 1201a from which a job request was received, as will be explained later more in detail with reference to the machining center 1204 and the NC lathe 1205a in FIG. 19.

Step S1108: With the position determined of the NC lathe 1205a to which a job was requested, this step instructs the automatic transporter 1202a with the pallet 1201a placed thereon to carry the pallet to the NC lathe 1205a.

Step S1109: This step waits for a job end notice from the NC lathe 1205a.

Step S1110: The work shape 1402, the number of remaining jobs 1403 and the predicted maximum residual job time 1404 in the work information storage unit 1012 shown in FIG. 14 are updated. When the work shown in FIG. 13 is newly charged, the job 1 is performed first of all. Once the job is executed correctly, the work shape 1402 assumes a machining shape 1311 of the job 1 as shown in FIG. 3B, with the result that the number of remaining jobs 1403 is decreased and the time actually taken for the job is subtracted from the predicted maximum residual job time 1404 and stored. The order of priority of the work is calculated again from the predicted maximum residual job time 1404 and the delivery time 1306 of the work after being updated.

Step S1111: The job completion flags 1308 of the work is checked, and if all of the flags 1308 are in "job completion" state, the process is passed to step S1113.

Step S1112: The job completion message is sent to the job progress control unit 1209.

Step S1113: The job completion flag 1302 is set in "job completion" state, and the automatic transporter 1202a is instructed for delivery out of the system.

The procedure from steps S1101 to S1113 is repeated.

Figure 18:
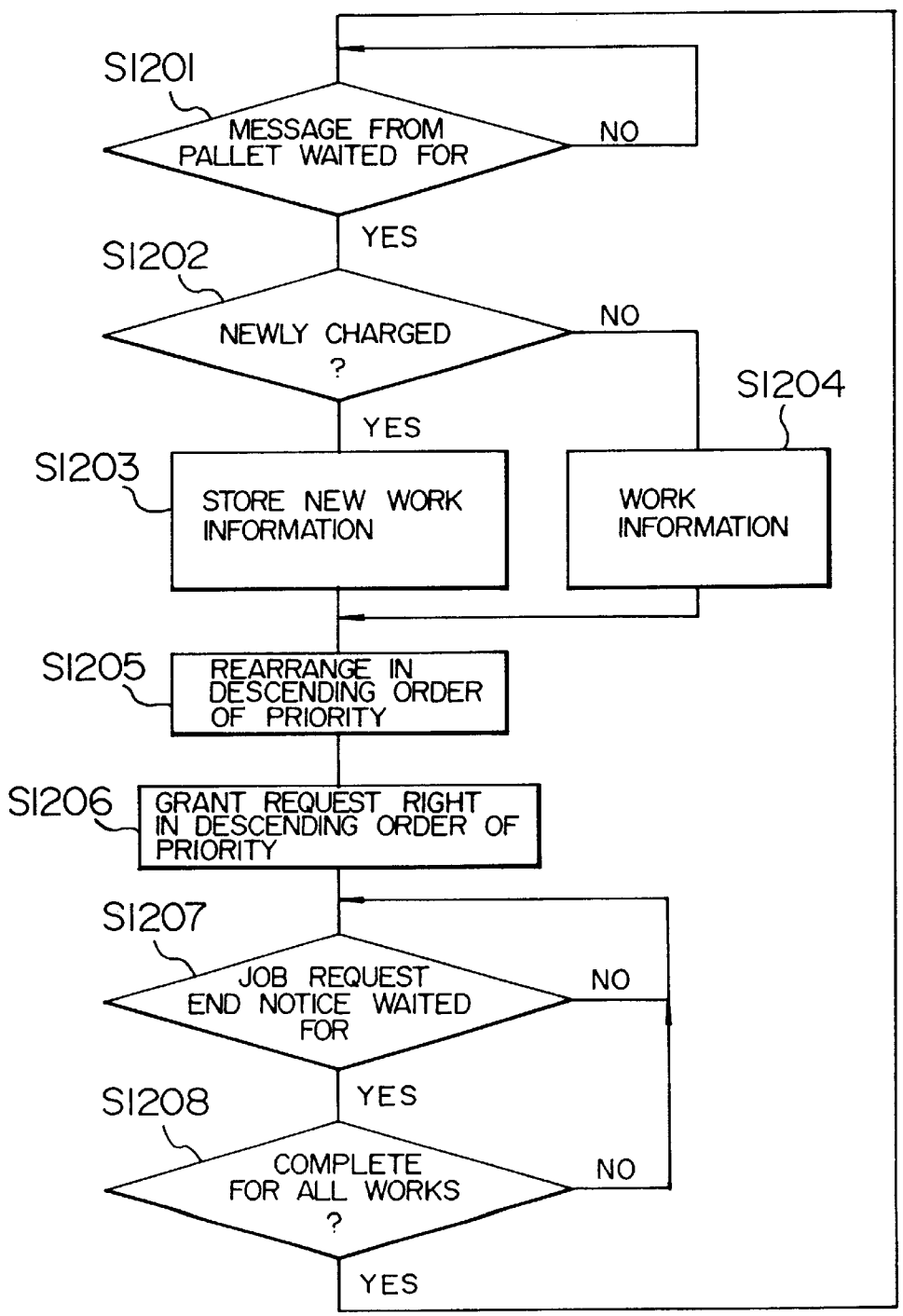
FIG. 18 is a flowchart of operation of the job request right effectuation unit.

Now, the flow of operation of the job request right effectuation unit 1024 shown in FIG. 18 will be explained.

Step S1201: This step waits for a message from the pallet 1201. The message sent out at step S1102 or S1113 for the operation of the pallet 1201 described above is also waited for.

Step S1202: It is decided whether the message received is from the newly-charged pallet 1201 to thereby change the flow of operation.

Step S1203: A region for a new work is secured in the work priority storage unit 1025, and information is written into the work number 1501 and the order of priority 1502 from the message received, thereby setting the job-in-process flag 1503 in ready state.

Step S1204: The order of priority 1502 of the work number 1501 corresponding to the work number in the message is rewritten into the order of priority in the message thereby to set the job-in-process flag 1503 in ready state.

Step S1205: The information in the work priority storage unit 1025 is rearranged in the descending order of priority 1502. FIG. 15 shows an example after completion of this step.

Step S1206: The job request right is granted to the pallets 1201 in the descending order of priority from the information of the work priority storage unit 1025.

Step S1207: This steps checks to see whether all the works in the ready state in the work priority storage unit 1025 are granted the job request right or not, and if there is any work not granted the job request right, the checking is continued until no such work exists.

The procedure from steps S1201 to S1207 is repeated.

Figure 19:
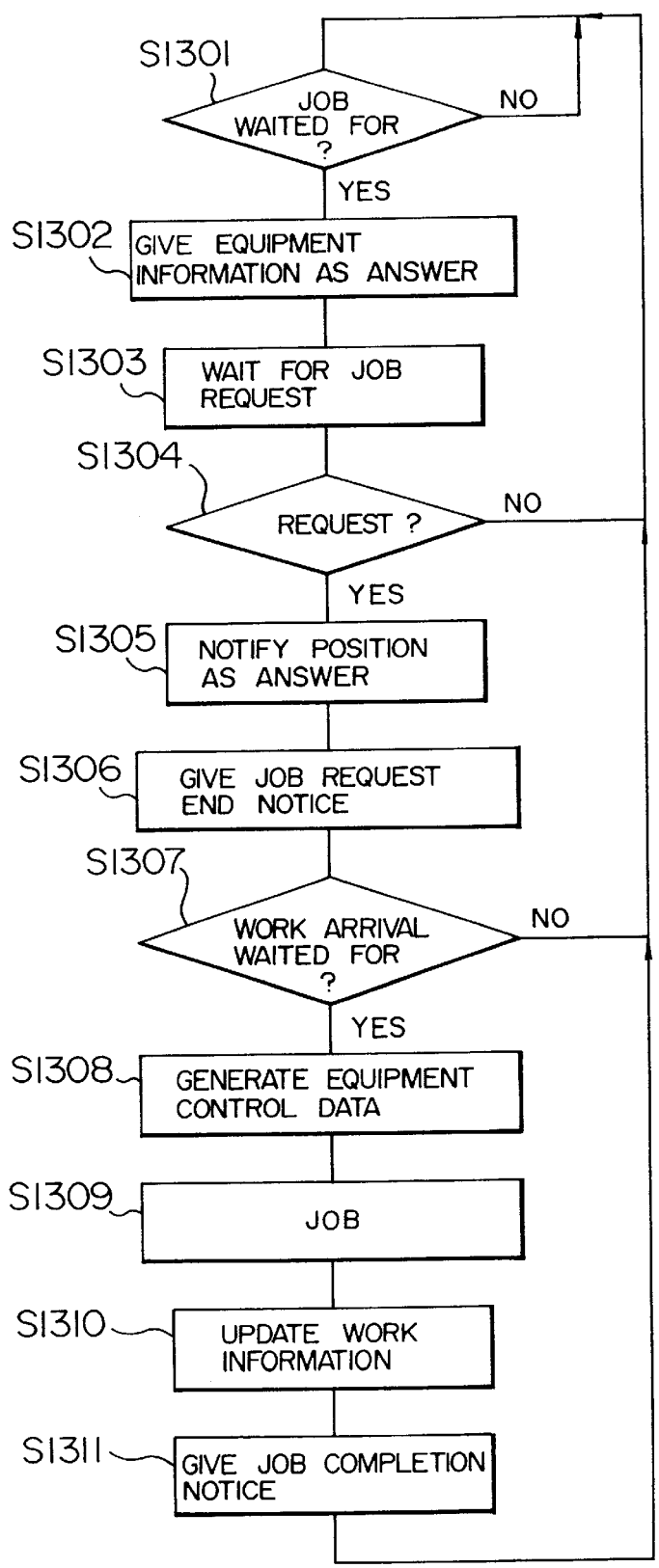
FIG. 19 is a flowchart of equipment operation.

Finally, the flow of operation of the equipment 1002 will be explained with reference to the NC lathe 1205a shown in FIG. 19 as an example. Although this example refers to the flow of operation of the machining center 1204 and the NC lathe 1205, a similar flow may be studied also for other equipment as far as it has the function of the equipment 1002.

Step S1301: This step waits for the job broadcast from the pallet 1201 at step S1104, i.e., the accuracy 1310 and the machining shape 1311.

Step S1302: The job workability decision unit 1028 checks the information received at step 1301 with the accuracy 1603, the maximum size 1605 and minimum size 1606 stored in the equipment information storage unit 1010 to decide the workability of job. If the job is possible to execute, the speed 1604 of the NC lathe 1205a is given as an answer to the pallet 1201 which has issued the job at step S1104. If the job is impossible to execute, on the other hand, the process is returned to step S1301.

Step S1303: This step waits for the arrival of a job request from step S1107.

Step S1304: If the contents of the request received at step S1303 is an unemployment notice, the process is returned to step S1301. If the job is requested, on the other hand, the following procedure is taken.

Step S1305: The position 1601 of the NC lathe 1205a is given as an answer to the pallet 1201 that has issued a job request.

Step S1306: A job request end notice is sent to the job progress control unit 1209.

Step S1307: This step waits for the arrival of a work. If no work arrives after the lapse of a predetermined length of time, the process is returned to step S1301.

Step S1308: operation is for controlling the machining operation is generated from the machining shape 1311 by the job execution unit 1020 by use of the equipment control data generation unit 1018.

Step S1309: The job execution unit 1020 controls the NC lathe 1205a and continues the job on the basis of the NC data generated at step S1308.

Step S1310: On the basis of the job result, a new work shape and the time required for the job are transmitted to the pallet 1201.

Step S1311: A job end notice is sent to the pallet 1201.

The procedure from steps S1301 to S1311 is repeated.

If the functions of the job request right effectuation unit 1024 and the work priority storage unit 1025 are added to the pallet 1201 without using the job progress control unit 1209, the same effect as the above-mentioned embodiments is obtained, although the load on the pallet 1201 is increased. An example is described below.

The configuration of this example is substantially the same as that shown in FIG. 12. The difference lies in that the job request right effectuation unit 1024 and the work priority storage unit 1025 are mounted on the pallet 1201.

Figure 20:
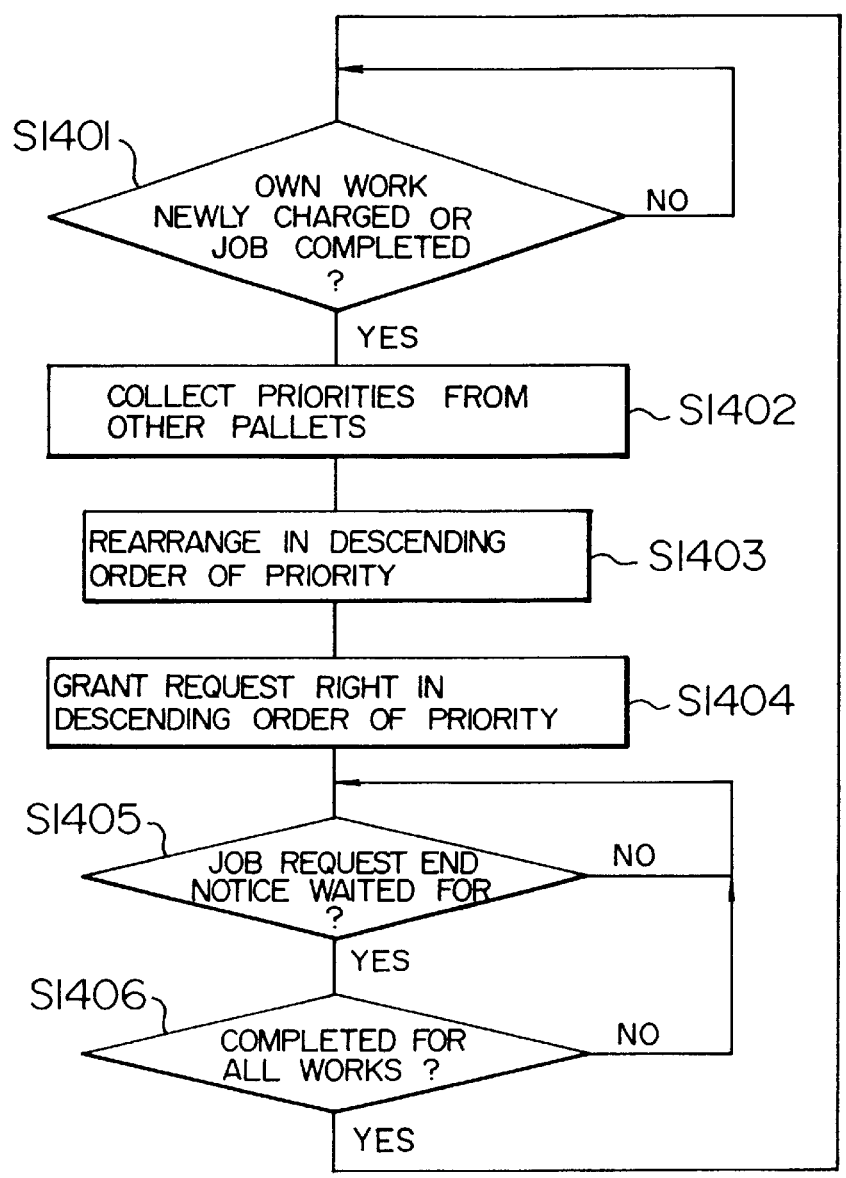
FIG. 20 is a flowchart of operation of the job request right effectuation unit placed in a pallet.

FIG. 20 shows the flow of operation with the job request right effectuation unit 1024 mounted on the pallet 1201.

Step S1401: The job request right effectuation unit 1024 waits for the charging of new work or the completion of a job. In this example, the job request right effectuation unit 1024 on the pallet 1201 is not energized until this condition is met.

Step S1402: The job request right effectuation unit 1024 broadcasts a priority return demand to all the pallets 1201 and collects the order of priority of all the works. The order of priority thus collected is stored in the work priority storage unit 1025.

Step S1403: The information in the work priority storage unit 1025 are rearranged in the descending order of priority.

Step S1404: The job request right is granted to the works from the work priority storage unit 1025 in the descending order of priority.

Step S1405: This step waits for the arrival of a job request end notice from the pallet 1201.

Step S1406: This step checks to see whether all the works waiting in the work priority storage unit 1025 are granted the job request right, and if there is any work not granted the job request right, the checking is continued until there all the works are granted the job request right.

The procedure from steps S1401 to S1406 is repeated. The machining center 1204 and the NC lathe 1205 that have been granted the job request right may operate the same way as in the above-mentioned embodiments. In this way, even when the job request right effectuation unit 1024 is mounted on the pallet 1201, the same effect as in the above-mentioned embodiments is obtained.

Figure 21:
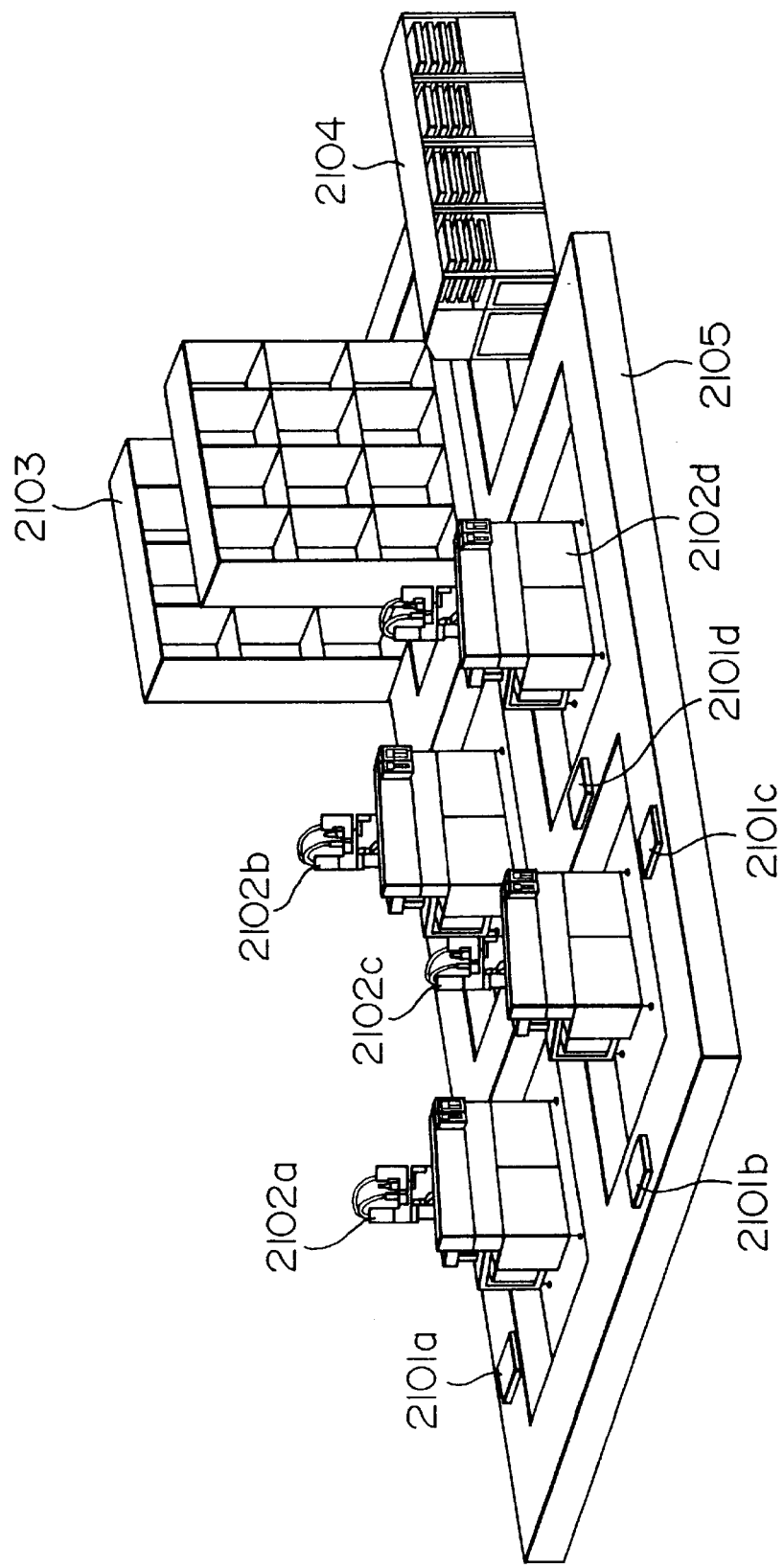
FIG. 21 is a diagram showing a configuration of an embodiment of the present invention for assembly work.

Now, an embodiment of the present invention as applied to the assembly work will be explained with reference to the case in which parts are mounted on a printed wiring board. A configuration of such an embodiment is shown in FIG. 21. This assembly system includes pallets 2101a to 2101d with all the parts placed thereon, parts supply unit 2104 for supplying all the parts to the pallet 2101, an automatic warehouse 2103 capable of delivering a given pallet 2101 at a given time, parts mounting unit 2102a to 2102d, and a flexible transport line 2105 for transporting a given pallet to a given part mounting unit 2102. In this embodiment, the parts supply unit 2104 includes a parts supply unit for supplying parts to the pallet 2101 and a design information write unit for writing assembly information in the pallet 2101.

FIG. 22 shows an example of assembly information stored in the design information storage unit 1011. This includes the description of the parts assembled on a printed wiring board and the positions of assembly thereof. The work number 2201 is an identifier for discriminating the individual printed wiring boards in this system and is unique to the printed wiring board. The job completion flag 2202 is for indicating whether all the jobs on a printed wiring board are complete or not. The work size 2203 is indicative of the size of a printed wiring board. The number of jobs 2204 represents the number of assembly jobs conducted on a printed wiring board. The predicted maximum job time 2205 is information used for determining the order of priority of a work. This information is calculated and written by the job time calculation unit 1026 in advance in terms of the time taken when only the slowest equipment is used. The delivery time 2206 indicates the delivery time of the printed wiring board.

The initial information on the printed wiring board are described above, and are followed by the assembly information which is as many as the number of jobs 2204. The number of jobs 2207 provides information for discriminating the assembly work on the printed wiring board. Although unique to a job, this identifier does not necessarily represent the order of job execution. The job completion flag 2208 indicates whether a particular job is complete or not. The preceding job number 2209 indicates the job required to have been executed before the present job, and is used for indicating the order of execution of all jobs. The part type 2210 indicates the parts assembled on the printed wiring board. The parts assembly unit 2102 obtains information on the grip and the shape of parts from a parts database on the basis of the information on the part type 2210. The part position 2211 indicates the position of an unassembled part placed on the pallet 2101. The assembly position 2212 is the position of assembly on the printed wiring board. A control data for the parts supply unit 2104 is prepared on the basis of the part position 2211 and the assembly position 2212.

An example of the work information stored in the work information storage unit 1012 is shown in FIG. 23. This is the information representing the work condition at the time point of completion of a job. The work number 2301 is the same as the work number 2201 and is unique to the printed wiring board in this system. The number of remaining jobs 2302 indicates the number of jobs remaining at the above-mentioned time point. The predicted maximum residual job time 2303 is the maximum time predicted for the jobs remaining incomplete at the above-mentioned time point. This is obtained by subtracting the actual job time from the predicted maximum job time. The work information is comprised of these information, and indicates the condition after completion of the job 50 in the example under consideration.

The contents of the work priority storage unit 1025 used in this example are similar to those for the embodiment shown in FIG. 15.

FIG. 24 is a diagram showing an example of information stored in the equipment information storage unit 1017. The position 2401 indicates the position of the particular equipment. This position represents an absolute position in this system, depending on which the pallet 2101 is transported by the flexible transport line 2105. The job type 2402 is the type of job specialized in by the equipment. In this example, a mounter is used specializing in the surface mounting. The accuracy 2404 is the speed of the equipment as relative to that of other equipment. The procedure for performing the jobs in this system on the basis of the above-mentioned information will be described with reference to FIGS. 18, 25 and 26.

According to the present embodiment, as in the above-mentioned machining system, the operation of the system as a whole is performed on the basis of individual judgements while information is exchanged between the pallet 2101, the parts assembly unit 2102 and the job progress control unit 1003. The job progress control unit 1003 which operates in a way similar to the one in the aforementioned embodiments will not be explained again.

According to the present embodiment, the flow of operation will be described in three parts in view of the fact that the whole system is operated according to the individual judgements while information is exchanged between the pallet 2101, the parts assembly unit 2102 and the job progress control unit 1003.

Figure 25:
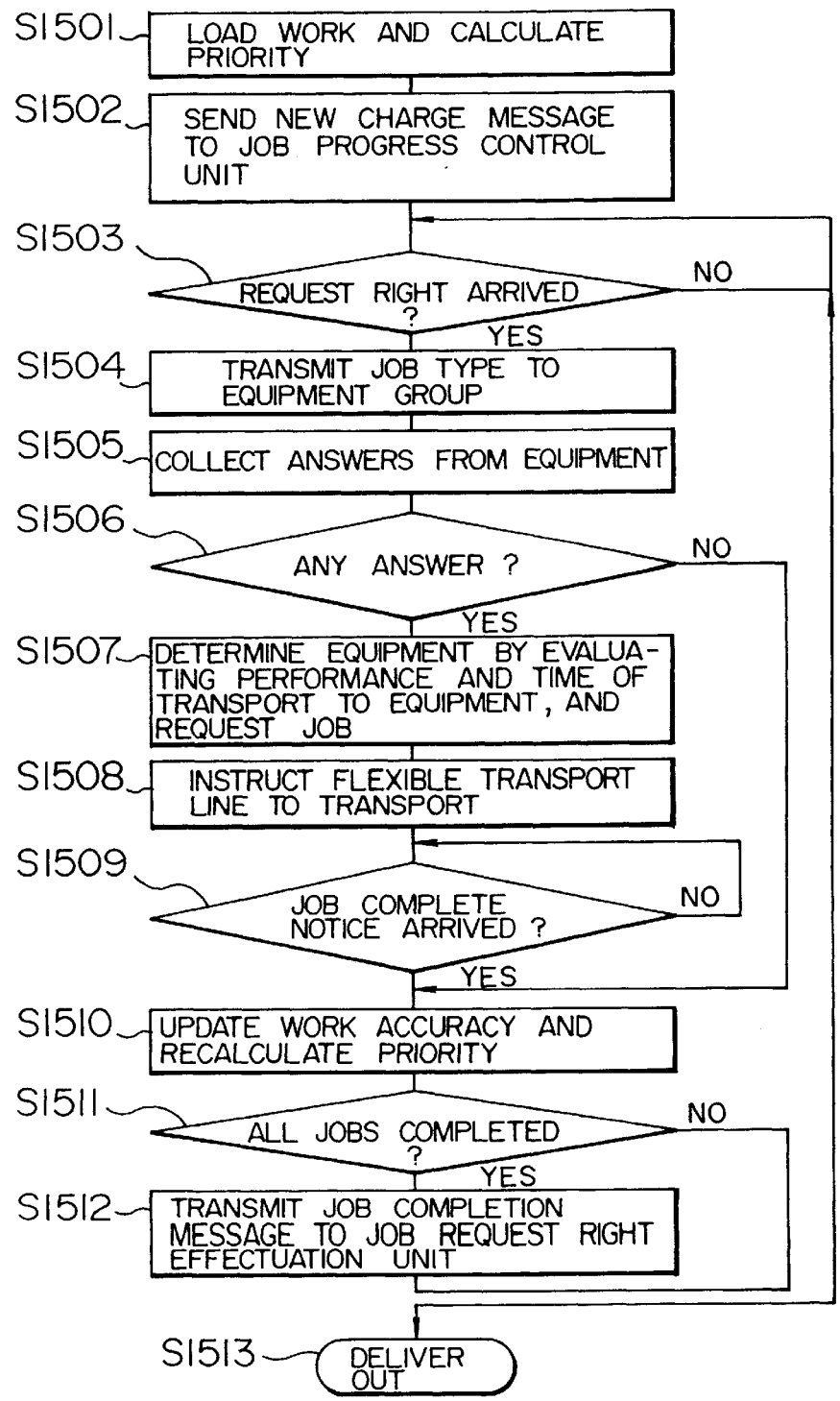
FIG. 25 is a flowchart of pallet operation.

FIG. 25 is a diagram showing the flow of operation of the pallet 2101.

Step S1501: The pallet 2101 receives the work 1203 at the parts supply unit 1207, which parts are stored in the automatic warehouse 2103. The work priority determination unit 1009 calculates the order of priority by use of the predicted maximum job time 2205 and the delivery time 2206 in the design information storage unit 1011.

Step S1502: A new work charge message is sent to the job progress control unit 1003 by way of the work communication section 1013. Upon receipt of this message, the job progress control unit 1003 grants the job request right to an appropriate pallet 2101, as will be described more in detail later with reference to the job progress control unit 1003 shown in FIG. 18.

Step S1503: This step waits for the arrival of the job request right from the job progress control unit 1003.

Step S1504: First, a chain of job types 2402 to be conducted in the next process is formed and is broadcast to all the parts assembly unit 2102. Upon receipt of this message, the parts assembly unit 2102 decides on the workability of a job and gives an answer to the pallet 2101, as will be described in more detail later with reference to the parts assembly unit 2102 shown in FIG. 19.

Step S1505: Wait for answers from the parts assembly unit 2102. In order to collect answers from a plurality of the parts assembly units 2102, a time limit is provided so that answers collected within the time limit are regarded as effective ones.

Step S1506: This step checks to see whether any answer is given from the parts assembly unit 2102. In the absence of an answer, a job request end notice is sent to the job progress control unit 1003 judging that there is not any parts assembly unit 2102 capable of executing the next job on the printed wiring board.

Step S1507: In consideration of the position 2401 and the speed 2404 in the answers from the parts assembly unit 2102 collected at step S1505, the parts assembly unit 210? capable of executing the transport and the job in the fastest way is selected, and a job request is sent thereto. On the other hand, a job request end notice is sent to the job progress control unit 1003 in order to notify that a job request has ended. Upon receipt of this notice, the job progress control unit 1003 sets the job-in-process flag 1503 in "job-in-process" state, as will be described more in detail later with reference to the job progress control unit 1003 shown in FIG. 18. The parts assembly unit that has received a job request, on the other hand, notifies the position of the parts assembly unit 2102 to the pallet 2101 from which the job request has come, as will be described more in detail later with reference to the parts assembly unit 2102 shown in FIG. 19.

Step S1508: The position of the parts assembly unit is determined from the answers of the parts assembly unit 2102, and the flexible transport line 2105 is instructed to transport the pallet 2101 to the particular parts assembly unit.

Step S1509: This step waits for a job end notice from the parts assembly unit.

Step S1510: The number of remaining jobs 2302 and the predicted maximum residual time 2303 in the work information storage unit 1021 shown in FIG. 23 are updated. In the case under consideration, fifty parts are completely assembled on the printed wiring board 101 (work number 101), indicating that 1.5 hours has passed.

Step S1511: This step checks the job completion flag 2208, and if this flag is in "job completion" state, the process is passed to step S1513.

Step S1512: The job completion message is sent to the job progress control unit 1003.

Step S1513: The job completion flag 2202 is set in "job completion" state, and the flexible transport line 2105 is instructed for delivery out of the system.

The procedure from steps S1501 to S1513 is repeated.

The flow of operation of the job request right effectuation unit 1024 which is not much different from that of the machining system mentioned above will not be explained any more.

Figure 26:
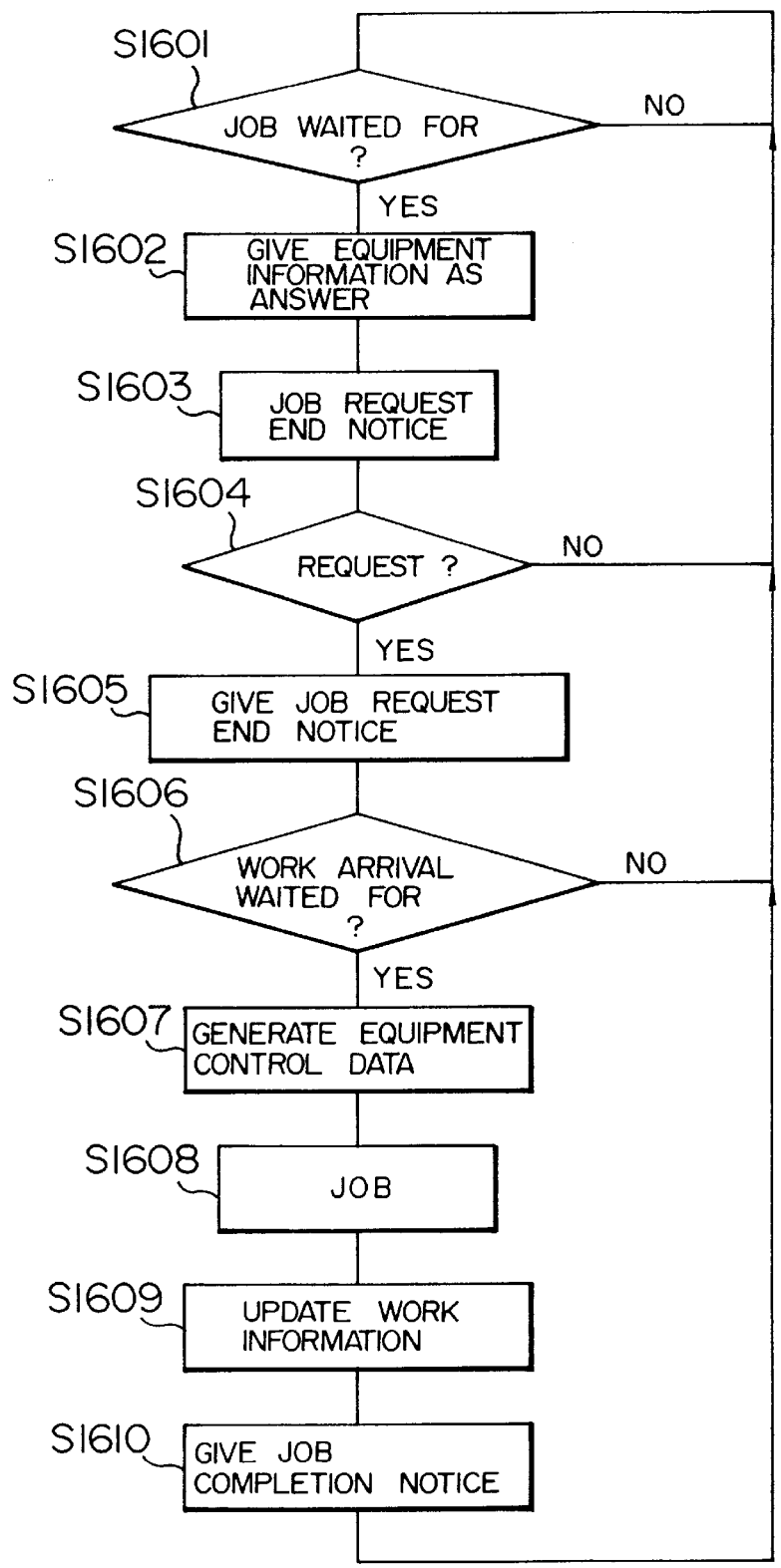
FIG. 26 is a flowchart of equipment operation.

Finally, description will be made of the flow of operation of the parts assembly unit 1202 shown in FIG. 26.

Step S1601 This step waits for a job broadcast from the pallet 2101 at step S1504, i.e., the job type 2402.

Step S1602: The job workability decision unit 1028 checks the information received at step S1601 with the accuracy 2403 stored in the equipment information storage unit 1010 to thereby decide the workability of the job. If the job is executable, the position 2401 and the speed 2404 of the parts assembly unit 2102 are given as an answer to the pallet 2101 that has transmitted the job at step S1504. If the job is not executable, by contrast, the process returns to step S1601.

Step S1603: This step waits for a job request from step S1507.

Step S1604 When an unemployment notice is received from step S1603, the process is returned to step S1601. If the notice is a job request, the following procedure is taken.

Step S1605: A job request end notice is sent to the job progress control unit 1003.

Step S1606 This step waits for the arrival of the pallet 2101. When the pallet 2101 fails to arrive after the lapse of a predetermined time, the process is returned to step S1601.

Step S1607: An NC data for controlling the assembly of parts of a series of types is generated by the job execution unit 1020 from the equipment control data generation unit 1018 from the assembly information shown in FIG. 22.

Step S1608: The job execution unit 1020 executes a job by controlling the parts assembly unit 2102 from the data obtained at step S1607.

Step S1609: The number of jobs actually performed and the time required for the jobs are transmitted to the pallet 2101 from the job result.

Step S1610: A job end notice is sent to the pallet 2101.

The procedure from steps S1601 to S1610 is repeated.

The foregoing is an explanation of embodiments of machining and assembly work according to the present invention. In a production control system of autonomous and decentralized type of the present invention, the job request right effectuation unit 1024 controls the order of job requests thereby to make possible the progress of jobs taking the delivery time into account.

According to the production control system of autonomous and decentralized type of the present invention, the job progress is controlled in accordance with the product delivery time while maintaining the system flexibility at the same time.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A work driven production control system, comprising:
   a plurality of pallets for carrying works;
   a plurality of production equipment;
   transport means for delivering a pallet to a given equipment;
   an automatic warehouse for housing a given work to be delivered to a determined one of said pallets;
   part supply means for delivering the given work from said automatic warehouse to the determined one of said pallets; and
   job progress control means including job request right effectuation means for deciding to grant the job request right to a pallet carrying a work of top priority;
   wherein each of said pallets includes equipment selection means, design information storage means for storing the design information of the work placed on the pallet, work information storage means for storing the job history and the present condition of said work, work priority determination means for calculating the order of priority of said work, and communication means for communicating with said production equipment, and
   wherein said work priority determination means recalculates a priority by using at least a predicted maximum job time and a delivery time stored in said design information storage means after every job is correctly executed,
   said equipment selection means includes means for receiving said job request right, determining whether or not a job is executable on the basis of said design information and said work information, and selecting equipment to perform the next job of said work on said pallet if the job is determined to be executable,
   all of said production equipment includes:
      communication means for exchanging information with said plurality of pallets and said job progress control means,
      equipment information storage means,
      job workability determining means for checking a job type from the pallet with the accuracy thereof stored in said equipment information storage means to determine the workability of a job,
      equipment control data generation means for preparing NC data from the design information if the job workability determining means determines that the job is workable, and
      job execution means for executing a job by applying the NC data obtained by said equipment control data generation means to actual equipment for executing the job and acting on said work.

2. A production control system of work driven type according to claim 1, wherein said pallets include both of said work priority determination means and job request right effectuation means, and individual ones of said pallets communicate with others of said pallets and a plurality of equipment thereby to determine the next job on the work in accordance with the priority of the work.

3. A production control system of work driven type according to claim 1, wherein the determination of whether or not a job is executable by said equipment selection means is performed in communication with said job workability determining means.

4. A production control system of work driven type according to claim 1, wherein said job request right effectuation means of said job progress control means collects priorities of works of said plurality of pallets and issues a request for permission to execute a job to one of said plurality of pallets carrying a top priority work, and
   wherein said equipment selection means of said one of said plurality of pallets selects a job to be executed as work carried thereon based on the order of a plurality of jobs performed on said work stored as said design information in said design information storage means and work conditions stored as said work information in said work information storage means, determines workability of said job regarding a corresponding one of said plurality of production equipment corresponding to said selected job via said communication means, and determines one of said plurality of production equipment for performing a job to be executed based on a result of the determination.

5. A production control system of work driven type according to claim 4, wherein said equipment selection means selects a specific one of said plurality of equipment which has the least number of requests for execution of a job.

6. A production control system of work driven type according to claim 4, wherein said work priority determination means of said pallet, when recalculating a priority by using at least a predicted maximum job time and a delivery time stored in said design information storage means after every job is correctly executed, rearranges the recalculated priority of the jobs in descending order of priority.

7. A production control system of work driven type according to claim 4, wherein said equipment selection means inquires of all of said production equipment, via said communication means, whether respective ones of said production equipment are capable of executing the job.

8. A production control system of work driven type according to claim 4, wherein, when said equipment selection means of said one of said plurality of pallets is unable to find equipment capable of presently executing the job, said one of said plurality of pallets transfers the request for permission to execute the job to another one of said plurality of pallets.

9. A work driven production control system, comprising:
   a plurality of pallets for carrying works, each of said pallets including job request right effectuation means for deciding to grant the job request right to a particular pallet carrying a work of top priority;
   a plurality of production equipment;
   transport means for delivering a pallet to a given one of said production equipment; and
   an automatic warehouse for housing a given work to be delivered to a determined one of said pallets;
   part supply means for delivering the given work from said automatic warehouse to the determined one of said pallets;

wherein each of said pallets further includes equipment selection means, design information storage means for storing the design information of the work placed on the pallet, work information storage means for storing the job history and the present condition of said work, work priority determination means for calculating the order of priority of said work, and communication means for communicating with said production equipment, and wherein said work priority determination means recalculates a priority by using at least a predicted maximum job time and a delivery time stored in said design information storage means after every job is correctly executed, said equipment selection means includes means for receiving said job request right, determining whether or not a job is executable based on said design information and said work information, and selecting equipment to perform the next job of said work on said pallet if the job is determined to be executable, all of said production equipment includes:
  communication means for exchanging information with said plurality of pallets,
  equipment information storage means,
  job workability determining means for checking a job type from the pallet with the accuracy thereof stored in said equipment information storage means to determine the workability of a job,
  equipment control data generation means for preparing NC data from the design information if the job workability determining means determines that the job is workable, and
  job execution means for executing a job by applying the NC data obtained by said equipment control data generation means to actual equipment for executing the job and acting on said work.

10. A production control system of work driven type according to claim 9, wherein said work priority determination means of said pallet, when recalculating a priority by using at least a predicted maximum job time and a delivery time stored in said design information storage means after every job is correctly executed, rearranges the recalculated priority of the jobs in descending order of priority.

11. A production control system of work driven type according to claim 9, wherein the determination of whether or not a job is executable by said equipment selection means is performed in communication with said job workability determining means.

* * * * *